United States Patent
Futaki et al.

(10) Patent No.: US 10,477,439 B2
(45) Date of Patent: Nov. 12, 2019

(54) BASE STATION AND METHOD THEREOF

(71) Applicant: NEC Corporation, Tokyo (JP)

(72) Inventors: Hisashi Futaki, Tokyo (JP); Sadafuku Hayashi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 15/747,013

(22) PCT Filed: Jun. 21, 2016

(86) PCT No.: PCT/JP2016/002977
§ 371 (c)(1),
(2) Date: Jan. 23, 2018

(87) PCT Pub. No.: WO2017/022166
PCT Pub. Date: Feb. 9, 2017

(65) Prior Publication Data
US 2018/0213450 A1    Jul. 26, 2018

(30) Foreign Application Priority Data
Jul. 31, 2015    (JP) .................................. 2015-152736

(51) Int. Cl.
*H04W 36/00* (2009.01)
*H04W 88/10* (2009.01)
(Continued)

(52) U.S. Cl.
CPC ....... *H04W 36/0027* (2013.01); *H04W 16/32* (2013.01); *H04W 36/0033* (2013.01);
(Continued)

(58) Field of Classification Search
None
See application file for complete search history.

(56) References Cited

U.S. PATENT DOCUMENTS

2015/0264562 A1* 9/2015 Wu ..................... H04W 12/04
                                                          380/270
2015/0271726 A1* 9/2015 Kim .................. H04W 36/0055
                                                          370/329
(Continued)

FOREIGN PATENT DOCUMENTS

WO    WO-2014/103145 A1    7/2014
WO    WO-2015/115629 A1    8/2015

OTHER PUBLICATIONS

International Search Report corresponding to PCT/JP2016/002977 dated Sep. 20, 2016 (one page).
(Continued)

*Primary Examiner* — Eunsook Choi
(74) *Attorney, Agent, or Firm* — Wilmer Cutler Pickering Hale and Dorr LLP

(57) ABSTRACT

A secondary base station (2) is configured to receive an SeNB addition request message from a second master base station (3) while providing a radio terminal (1) with a secondary cell group (SCG) for DC in cooperation with a first master base station. The SeNB addition request message indicates whether each of at least one bearer that has already been configured in the secondary base station (2) for DC with the first master base station (1) is to be kept at the secondary base station (2). It is thus, for example, possible to contribute to performing a procedure for changing a master base station in Dual Connectivity (DC) by using existing inter-base station interface procedures and inter-base station signaling messages.

15 Claims, 16 Drawing Sheets

(51) Int. Cl.
   *H04W 16/32* (2009.01)
   *H04W 36/08* (2009.01)
   *H04W 72/04* (2009.01)
   *H04W 92/20* (2009.01)
   *H04W 88/06* (2009.01)

(52) U.S. Cl.
   CPC ........... *H04W 36/08* (2013.01); *H04W 72/04* (2013.01); *H04W 88/10* (2013.01); *H04W 92/20* (2013.01); *H04W 88/06* (2013.01)

(56) References Cited

U.S. PATENT DOCUMENTS

| | | | | |
|---|---|---|---|---|
| 2016/0029235 | A1* | 1/2016 | Kim | H04W 24/08 370/252 |
| 2016/0105928 | A1* | 4/2016 | Xu | H04L 5/0098 370/329 |
| 2017/0195935 | A1* | 7/2017 | Xu | H04W 36/08 |
| 2018/0027456 | A1* | 1/2018 | Nagasaka | H04W 16/32 370/331 |
| 2018/0035339 | A1* | 2/2018 | Mitsui | H04W 36/08 |
| 2018/0213450 | A1* | 7/2018 | Futaki | H04W 16/32 |
| 2018/0295670 | A1* | 10/2018 | Decarreau | H04W 76/38 |

OTHER PUBLICATIONS

3GPP TSG-RAN WG3#87 R3-150219 CATT, Solutions for inter-MeNB handover without SeNB change (Feb. 2015) (pp. 1-4).
3GPP TSG-RAN WG3#87 R3-150329, Ericsson, Analysis of inter-MeNB handover without SeNB change (Feb. 2015) (pp. 1-4).
3GPP TS 36.300 V12.6.0 Evolved Universal Terrestrial Radio Access (E-UTRA) and Evolved Universal Terrestrial Radio Access Network (E-UTRAN); Overall description; Stage 2 (Release 12) (Jun. 2015) (pp. 1-254).
3GPP TS 36.423 V12.6.0 Evolved Universal Terrestrial Radio Access Network (E-UTRAN); X2 application protocol (X2AP) (Release 12) (Jun. 2015) (pp. 1-208).

* cited by examiner

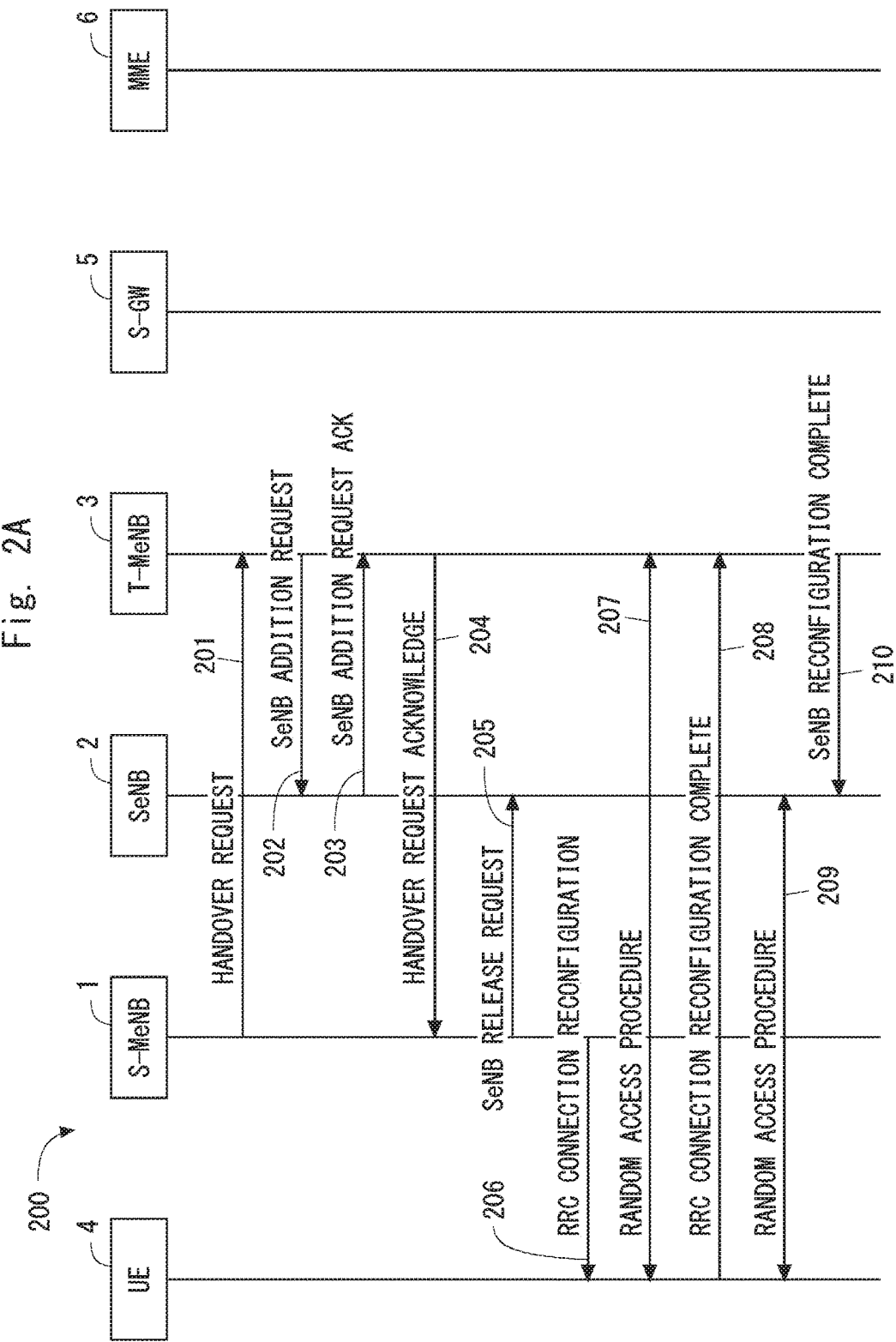

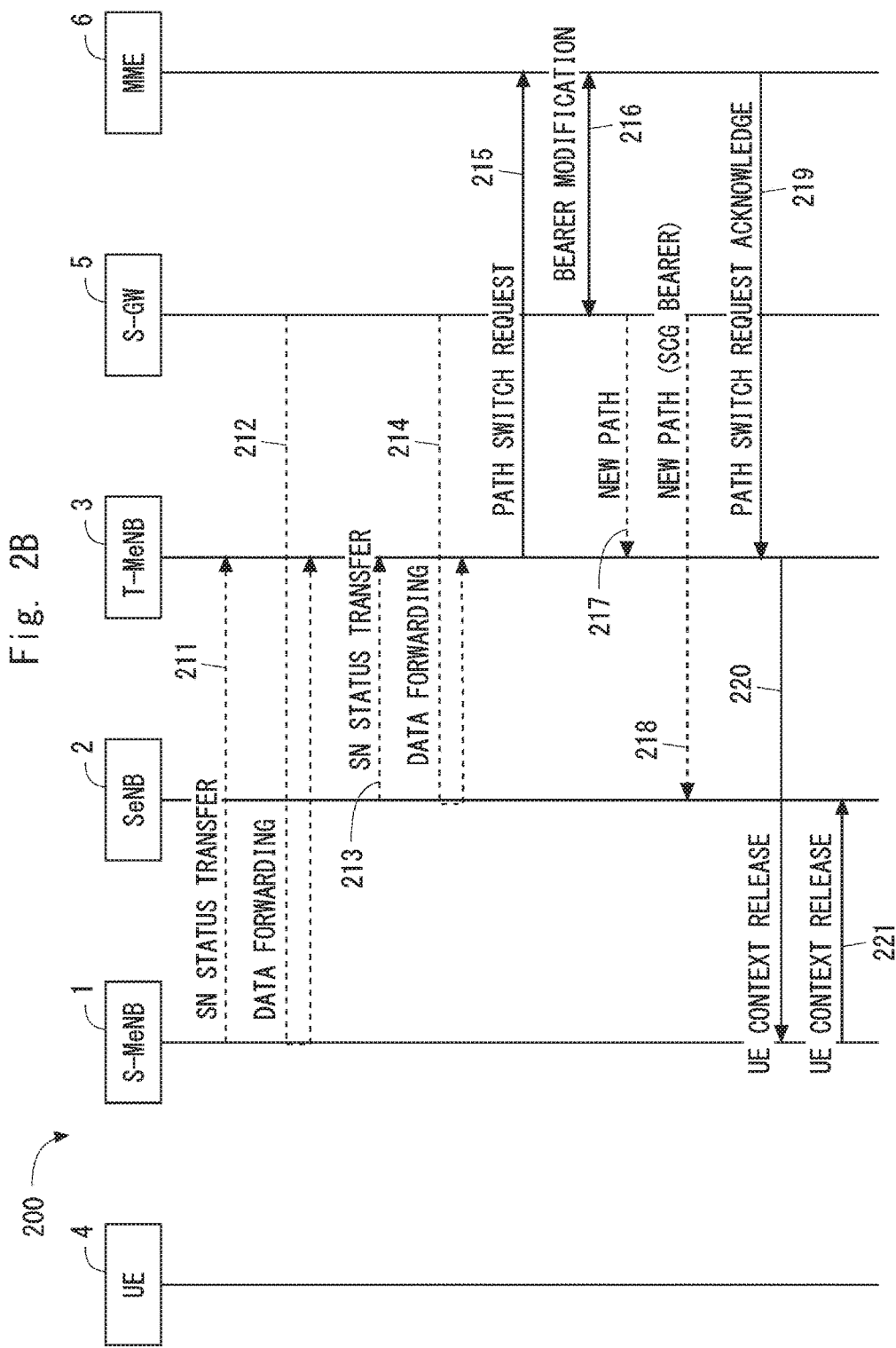

Fig. 5A 9.1.3.1 SENB ADDITION REQUEST

| IE/Groupe Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | | YES | reject |
| UE Security Capabilities | C-ifSCG Bearer Option | | 9.2.29 | | YES | reject |
| SeNB Security Key | C-ifSCG Bearer Option | | 9.2.72 | The S-KeNB which is provided by the MeNB, see TS 33.401 [18]. | YES | reject |
| ... | | | | ... | ... | ... |
| E-RABs To Be Added List | | 1 | | | YES | reject |
| >E-RABs To Be added Item | | 1..<maxnoof Bearers> | | | EACH | reject |
| ... | | | | ... | ... | ... |

Fig. 5B 9.1.3.1 SENB ADDITION REQUEST

| E-RABs To Be Changed List | | 0..1 | | | | |
|---|---|---|---|---|---|---|
| >E-RABs To Be Changed Item | | 1..<maxnoof Bearers> | | | EACH | ignore |
| >>CHOICE Bearer Option | M | | | | | |
| >>>SCG Bearer | | | | | | |
| >>>>E-RAB ID | M | | 9.2.23 | | - | - |
| >>>>DL Forwarding GTP Tunnel Endpoint | O | | GTP Tunnel Endpoint 9.2.1 | Identifies the X2 transport bearer used for forwarding of DL PDUs. | - | - |
| >>>>UL Forwarding GTP Tunnel Endpoint | O | | GTP Tunnel Endpoint 9.2.1 | Identifies the X2 transport bearer used for forwarding of UL PDUs. | - | - |
| >>>Split Bearer | | | | | | |
| >>>>E-RAB ID | M | | 9.2.23 | | - | - |
| >>>>DL Forwarding GTP Tunnel Endpoint | O | | GTP Tunnel Endpoint 9.2.1 | Identifies the X2 transport bearer used for forwarding of DL PDUs. | - | - |
| MeNB to SeNB Container | M | | OCTET STRING | Includes the SCG-Config Info message as defined in TS 36.331 [9] | YES | reject |

Fig. 8

9.1.1.2 HANDOVER REQUEST ACKNOWLEDGE

| IE/Groupe Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| E-RABs Admitted List | | 1 | | | YES | reject |
| >E-RABs Admitted Item | | 1..<maxnoof Bearers> | | | EACH | reject |
| >>E-RAB ID | M | | 9.2.23 | | - | - |
| >>UL GTP Tunnel Endpoint | O | | GTP Tunnel Endpoint 9.2.1 | Identifies the X2 transport bearer used for forwarding of UL PDUs. | - | - |
| >>DL GTP Tunnel Endpoint | O | | GTP Tunnel Endpoint 9.2.1 | Identifies the X2 transport bearer used for forwarding of DL PDUs. | - | - |
| >>E-RAB Status | O | | 9.2.X | Indicates that E-RAB is kept at SeNB or moved to T-MeNB during inter-MeNB HO. | ? | ? |
| Target eNB To Source eNB Transparent Container | M | | OCTET STRING | Includes the RRC E-UTRA Handover Command message as defined in subclause 10.2.2 in TS 36.331 [9] | YES | ignore |
| Criticality Diagnostics | M | | 9.2.7 | | YES | ignore |

Fig. 11A 9.1.3.11 SENB RELEASE REQUEST

| IE/Groupe Name | Presence | Range | IE type and reference | Semantics description | Criticality | Assigned Criticality |
|---|---|---|---|---|---|---|
| Message Type | M | | 9.2.13 | | YES | ignore |
| MeNB UE X2AP ID | M | | eNB UE X2AP ID 9.2.24 | Allocated at the MeNB | YES | reject |
| SeNB UE X2AP ID | O | | eNB UE X2AP ID 9.2.24 | Allocated at the SeNB | YES | reject |
| Cause | O | | 9.2.13 | | YES | ignore |
| E-RABs To Be Released List | O | 0..1 | | | YES | ignore |
| >E-RABs To Be Released Item | | 1..<maxnoof Bearers> | | | EACH | ignore |
| >>CHOICE Bearer Option | M | | | | | |
| >>>SCG Bearer | | | | | | |
| >>>>E-RAB ID | M | | 9.2.23 | | - | - |
| >>>>UL Forwarding GTP Tunnel Endpoint | O | | GTP Tunnel Endpoint 9.2.1 | Identifies the X2 transport bearer used for forwarding of UL PDUs. | - | - |
| >>>>DL Forwarding GTP Tunnel Endpoint | O | | GTP Tunnel Endpoint 9.2.1 | Identifies the X2 transport bearer used for forwarding of DL PDUs. | - | - |
| >>>>E-RAB Status | O | | 9.2.X | Indicates that E-RAB is kept at SeNB or moved to T-MeNB during inter-MeNB HO. | ? | ? |

Fig. 11B 9.1.3.11 SENB RELEASE REQUEST

| >>Split Bearer | | | | |
|---|---|---|---|---|
| >>>E-RAB ID | M | | 9.2.23 | - |
| >>>DL Forwarding GTP Tunnel Endpoint | O | | GTP Tunnel Endpoint 9.2.1 | Identifies the X2 transport bearer used for forwarding of DL PDUs. |
| >>>E-RAB Status | O | | 9.2.X | Indicates that E-RAB is kept at SeNB or moved to T-MeNB during inter-MeNB HO. |

BASE STATION AND METHOD THEREOF

CROSS-REFERENCE TO RELATED APPLICATIONS

This application is a national stage application of International Application No. PCT/JP2016/002977 entitled "Base Station and Method Thereof" filed on Jun. 21, 2016, which claims priority to Japanese Patent Application No. 2015-152736 filed on Jul. 31, 2015, the disclosures of which are hereby incorporated by reference in their entirety.

TECHNICAL FIELD

The present disclosure relates to a radio communication network and, in particular, to Dual Connectivity (DC).

BACKGROUND ART

The 3GPP Release 12 specifications define Dual Connectivity (DC) (see, for example, Non Patent Literature 1 and 2). DC is similar to but different from Coordinated Multipoint (CoMP) introduced in the 3GPP Release 11 specifications. In particular, in DC, different carrier frequencies are used for a macro cell and a small cell (picocell), a radio terminal (i.e., User Equipment (UE)) executes two Medium Access Control (MAC) entities (that is, the UE uses radio resources provided by two independent schedulers, one of which is in a master base station (i.e., Master eNodeB (MeNB)) and the other is in a secondary base station (i.e., Secondary eNB (SeNB))), and the UE needs to support simultaneous use of at least two UL carriers.

In DC of 3GPP Release 12, the UE is connected to one MeNB and one SeNB. The UE configured with DC (DC UE) uses two MAC entities and at least two Radio Link Control (RLC) entities for respective data flows on the MeNB and the SeNB. The MeNB in DC is an eNB that terminates S1-MME for the DC UE. The SeNB in DC provides additional radio resources for the DC UE. One or more serving cells provided for the UE by the MeNB are referred to as a Master Cell Group (MCG), and one or more serving cells provided for the UE by the SeNB are referred to as a Secondary Cell Group (SCG). The MCG is one or more serving cells associated with the MeNB and includes a Primary Cell (PCell) and optionally one or more Secondary Cells (SCells). The SCG is composed of one or more serving cells associated with the SeNB and includes a Primary Secondary Cell (PSCell) and optionally one or more Secondary Cells (SCells). In DC of 3GPP Release 12, the PSCell is a special cell in the SCG and is different from a normal SCell in that the PSCell is configured with the uplink (i.e., PUCCH) for the UE.

In the control plane architecture for DC, there is only one S1-MME per DC UE. The S1-MME is defined between the MeNB and a Mobility Management Entity (MME), and the MeNB terminates the S1-MME. The signaling between the MeNB and the SeNB regarding the DC UE is performed using a signaling interface (i.e., X2-C) between the eNBs.

For DC, two user plane architectures are allowed. In the one architecture, S1-U is only terminated in the MeNB and the MeNB forwards user plane data to the SeNB using X2-U. In the other architecture, S1-U can also be terminated in the SeNB.

Accordingly, three types of radio bearers, i.e., MCG bearer, split bearer, and SCG bearer, are defined for DC. Regarding the MCG bearer, the MeNB terminates an S1-U connection with a Serving Gateway (S-GW), and Radio protocols of the MCG bearer are only located in the MeNB to use MeNB resources. Thus, the SeNB is not involved in transferring user plane data of the MCG bearer on the Uu interface.

Regarding the split bearer, the MeNB terminates an S1-U connection with an S-GW, and Packet Data Convergence Protocol (PDCP) data (i.e., PDCP Protocol Data Unit (PDCP PDU)) is transferred between the MeNB and the SeNB. Thus, both the MeNB and the SeNB are involved in transferring user plane data of the split bearer on the Uu interface.

Regarding the SeNB bearer, the SeNB terminates an S1-U connection with an S-GW, and Radio protocols of the SeNB bearer are only located in the SeNB to use SeNB resources. Thus, the MeNB is not involved in transferring user plane data of the SCG bearer on the Uu interface.

Some overall procedures regarding DC are defined in Non Patent Literature 1 (see, for example, Section 10.1.2.8 of Non Patent Literature 1).

SeNB Addition Procedure:

This procedure is initiated by the MeNB to establish a UE context at the SeNB. This procedure is used to add at least the first cell (i.e., PSCell) of the SCG. In this procedure, there is always at least one bearer (split bearer or SCG bearer) configured in the SCG.

SeNB Modification Procedure:

This procedure is used to modify the SCG in the SeNB and is initiated by the MeNB or the SeNB. This procedure is used to modify, establish or release bearer contexts, to transfer bearer contexts to and from the SeNB, or to modify other properties of the UE context within the same SeNB. The MeNB uses this procedure to add or release SCG SCells, SCG bearer(s), and the SCG part of split bearer(s). The MeNB also uses this procedure to trigger PSCell change involving PSCell release.

SeNB Release Procedure:

This procedure is initiated by the MeNB or the SeNB and is used to initiate the release of the UE context at the SeNB.

Intra-MeNB Change Procedure:

This procedure is used to perform handover within the same MeNB while keeping the SCG in the same SeNB.

SeNB Change Procedure:

This procedure is used to change the SCG between SeNBs (inter-SeNB). This procedure is initiated by the MeNB and used to transfer a UE context from a source SeNB to a target SeNB and to change the SCG configuration in the UE from one SeNB to another SeNB. This procedure is basically implemented by a combination of the SeNB Addition procedure and the SeNB Release procedure.

MeNB to eNB Change Procedure:

This procedure is initiated by the MeNB. This procedure is used to transfer context data from a source MeNB and a source SeNB to a target eNB.

Signaling and transferring of user plane data between the MeNB and the SeNB in DC are performed through the X2 interface. Accordingly, the following X2 procedures for DC are defined (see, for example, sections 8.6 and 9.1.3 of Non Patent Literature 2). Some of the above-described overall procedures use these X2 procedures for DC.

SeNB Addition Preparation procedure
    MeNB initiated SeNB Modification Preparation procedure
    SeNB initiated SeNB Modification procedure
    MeNB initiated SeNB Release procedure
    SeNB initiated SeNB Release procedure In 3GPP Release 12, when a UE is handed over from the MeNB to another eNB (target eNB), the above-described MeNB to eNB Change procedure is used. In this procedure, the SeNB (SCG) is completely released. Therefore, when the SCG is needed after the handover, the target eNB should perform the SeNB Addition procedure again after the completion of the handover. That is, the MeNB to eNB Change procedure requires, in addition to a normal handover procedure, signaling similar to the SeNB Change procedure (i.e., a combination of the SeNB Release procedure and the SeNB Addition procedure). Further, regarding the SCG bearer, data forwarding from the SeNB to the source MeNB and data forwarding from the source MeNB to the target eNB need to be performed.

In 3GPP Release 13, support of an Inter-MeNB handover from the source MeNB to the target MeNB without SeNB change, or support of an Inter-MeNB handover involving the SeNB Addition procedure, is being discussed. When these procedures are supported, the target eNB may not need to perform the SeNB Addition procedure to configure the SCG again at the SeNB. In addition, data forwarding regarding the SCG bearer from the SeNB to the source MeNB and from the source MeNB to the target eNB may become unnecessary.

Patent Literature 1 also discloses some procedures for a handover of a radio terminal from a first master base station to a second master base station during Dual Connectivity. In one of the procedures disclosed in Patent Literature 1, when a radio terminal in Dual Connectivity is handed over from the first master base station to the second master base station, the first master base station requests a secondary base station to suspend providing services in a SCell, and then the secondary base station suspends providing the services in the SCell and keeps communication status information about the SCell. Further, in this procedure, the second master base station sends an instruction to resume communication to the secondary base station after the handover and, in response to the instruction, the secondary base station resumes the services in the SCell based on the communication status information about the SCell, which is kept in the secondary base station. The communication status information about the SCell includes, for example, at least one of (a) transmission or reception status of user data (User Plane (U-plane)), (b) service information, (c) bearer information, and (d) radio resource configuration information.

CITATION LIST

Patent Literature

Patent Literature 1: International Patent Publication No. WO2014/103145

Non Patent Literature

Non Patent Literature 1: 3GPP TS 36.300 V12.6.0 (2015-06), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", June 2015

Non Patent Literature 2: 3GPP TS 36.423 V12.6.0 (2015-06), "3rd Generation Partnership Project; Technical Specification Group Radio Access Network; Evolved Universal Terrestrial Radio Access Network (E-UTRAN); X2 application protocol (X2AP) (Release 12)", June 2015

SUMMARY OF INVENTION

Technical Problem

It may be preferable that MeNB change (or Inter-MeNB handover) from a first MeNB to a second MeNB without SeNB change, or MeNB change (or Inter-MeNB handover) involving SeNB Addition, is implemented using the existing X2 procedures and X2 messages regarding DC defined in the 3GPP Release 12 specifications Furthermore, in these MeNB changes, it may be preferable to perform control such that, while a part of bearers that has already been configured in the SeNB for Dual Connectivity are kept at the SeNB, the rest of the bearers are moved to the second MeNB or released.

One of objects to be attained by embodiments disclosed in the present specification is to provide an apparatus, a method, and a program that contribute to performing, while providing Dual Connectivity to a radio terminal (UE), a master base station (MeNB) change procedure without the release of a secondary base station (SeNB), or a master base station (MeNB) change procedure involving the addition of a secondary base station (SeNB), by using existing inter-base station interface (X2 interface) procedures and inter-base station signaling messages (X2 messages). Note that this object is only one of the objects to be attained by the embodiments disclosed herein. Other objects or problems and novel features will become apparent from the following descriptions in the specification and the accompanying drawings.

Solution to Problem

In a first aspect, a secondary base station includes at least one radio transceiver and at least one processor coupled to the at least one radio transceiver. The at least one processor is configured to receive an SeNB addition request message from a second master base station while the secondary base station provides a radio terminal with a secondary cell group (SCG) for dual connectivity in cooperation with a first master base station. The SeNB addition request message indicates whether each of at least one bearer that has already been configured in the secondary base station for the dual connectivity is to be kept at the secondary base station.

In a second aspect, a method in a secondary base station includes:
(a) receiving an SeNB addition request message from a second master base station while providing a radio terminal with a secondary cell group (SCG) for dual connectivity in cooperation with a first master base station, the SeNB addition request message indicating whether each of at least one bearer that has already been configured in the secondary base station for the dual connectivity is to be kept at the secondary base station; and
(b) upon receiving the SeNB addition request message, distinguishing one or more first bearers to be kept at the secondary base station from one or more second bearers that do not need to be kept at the secondary base station.

In a third aspect, a second master base station includes at least one radio transceiver and at least one processor coupled to the at least one radio transceiver. The at least one processor is configured to send an SeNB addition request message to a secondary base station while the secondary base station provides a radio terminal with a secondary cell group (SCG) for dual connectivity in cooperation with a first master base station. The SeNB addition request message indicates whether each of at least one bearer that has already been configured in the secondary base station for the dual connectivity is to be kept at the secondary base station.

In a fourth aspect, a method in a second master base station includes sending an SeNB addition request message to a secondary base station while the secondary base station provides a radio terminal with a secondary cell group (SCG) for dual connectivity in cooperation with a first master base station. The SeNB addition request message indicates whether each of at least one bearer that has already been configured in the secondary base station for the dual connectivity is to be kept at the secondary base station.

In a fifth aspect, a first master base station includes at least one radio transceiver and at least one processor coupled to the at least one radio transceiver. The at least one processor is configured to, while a secondary base station provides a radio terminal with a secondary cell group (SCG) for dual connectivity in cooperation with the first master base station, send a handover request of the radio terminal to a second master base station and receive a response message to the handover request from the second master base station. The response message indicates whether each of at least one bearer that has already been configured in the secondary base station for the dual connectivity is to be kept at the secondary base station or moved to the second master base station.

In a sixth aspect, a method in a first master base station includes:
(a) while a secondary base station provides a radio terminal with a secondary cell group (SCG) for dual connectivity in cooperation with the first master base station, sending a handover request of the radio terminal to a second master base station; and
(b) receiving a response message to the handover request from the second master base station, the response message indicating whether each of at least one bearer that has already been configured in the secondary base station for the dual connectivity is to be kept at the secondary base station or moved to the second master base station.

In a seventh aspect, a program includes instructions (software codes) that, when loaded into a computer, causes the computer to perform the method according to the above-described second, fourth, or sixth aspect.

In an eighth aspect, a radio terminal includes: at least one radio transceiver to communicate with a first master base station, a second master base station, and a secondary base station; and at least one processor. The first master base station, the second master base station, and the secondary base station are configured to, while the secondary base station provides the radio terminal with a secondary cell group (SCG) for dual connectivity in cooperation with the first master base station, execute a procedure for changing a master base station in the dual connectivity from the first master base station to the second master base station. The at least one processor is configured to receive from the first master base station, during the procedure, a master cell group (MCG) configuration regarding the second master base station and an SCG configuration regarding the secondary base station. Further, the at least one processor is configured to, in response to receiving the MCG configuration and the SCG configuration, judge whether each of at least one bearer that has already been configured in the secondary base station for the dual connectivity is to be kept at the secondary base station or moved to the second master base station. Furthermore, the at least one processor is configured to change the master base station in the dual connectivity from the first master base station to the second master base station while keeping a connection to the SCG in the secondary base station, the connection including at least one bearer.

Advantageous Effects of Invention

According to the above aspects, it is possible to provide an apparatus, a method, and a program that contribute to performing, while providing Dual Connectivity to a radio terminal (UE), a master base station (MeNB) change procedure without involving the release of a secondary base station (SeNB), or a master base station (MeNB) change procedure involving the addition of a secondary base station (SeNB), by using existing inter-base station interface (X2 interface) procedures and inter-base station signaling messages (X2 messages).

BRIEF DESCRIPTION OF DRAWINGS

FIG. 2A is a sequence diagram showing an example of an overall procedure of MeNB change (inter-MeNB handover) according to some embodiments;

FIG. 2B is a sequence diagram showing an example of an overall procedure of MeNB change (inter-MeNB handover) according to some embodiments;

FIG. 5A is a diagram showing an example of modification of the SeNB Addition Request message;

FIG. 5B is a diagram showing an example of modification of the SeNB Addition Request message;

FIG. 8 is a diagram showing an example of modification of a Handover Request Acknowledge message;

FIG. 11A is a diagram showing an example of modification of an SeNB Release Request message;

FIG. 11B is a diagram showing an example of modification of the SeNB Release Request message;

DESCRIPTION OF EMBODIMENTS

Hereinafter, specific embodiments will be described in detail with reference to the drawings. The same or corresponding elements are denoted by the same reference signs throughout the drawings, and repeated descriptions will be omitted as necessary for the sake of clarity.

The following descriptions on the embodiments mainly focus on an Evolved Packet System (EPS) accommodating LTE and SAE (System Architecture Evolution). However, these embodiments are not limited to the EPS and may be applied to other mobile communication networks or systems such as 3GPP UMTS, 3GPP2 CDMA 2000 system (1×RTT, High Rate Packet Data (HRPD), global system for mobile communications (GSM (registered trademark))/General packet radio service (GPRS), and WiMAX system.

Figure 1:
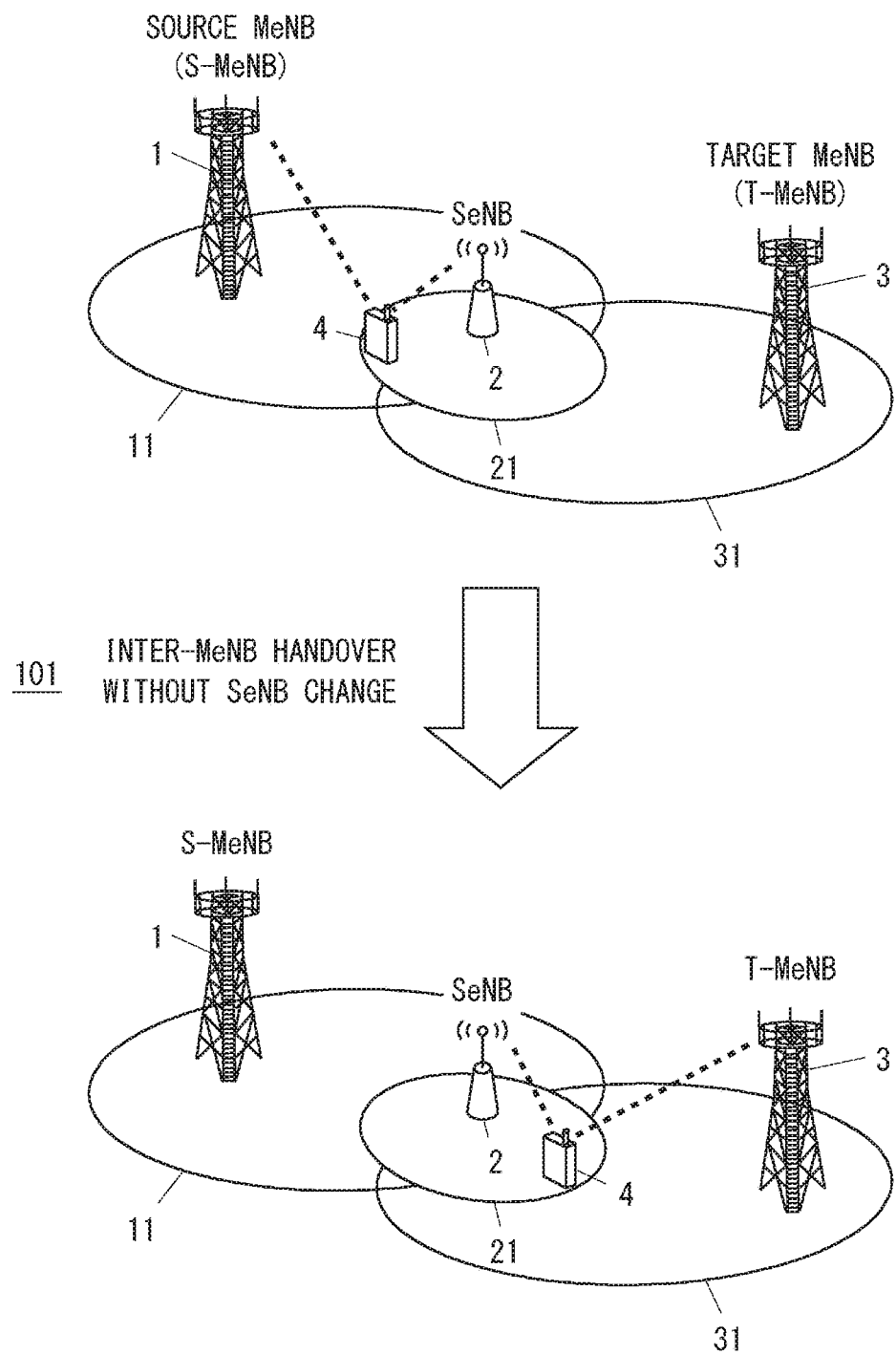
FIG. 1 is a diagram illustrating a configuration example of a radio communication network according to some embodiments.

FIG. 1 shows a configuration example of a radio communication network according to some embodiments. In the example of FIG. 1, the radio communication network includes a base station (eNB) 1, a base station (eNB) 2, a base station (eNB) 3, and a radio terminal (UE) 4. The eNB 1 and eNB 2 serve respectively as an MeNB and an SeNB for Dual Connectivity (DC) to the UE 4. The UE 4 is configured with DC by the MeNB 1 and simultaneously uses an MCG including a cell 11 provided by the MeNB 1 and an SCG including a cell 21 provided by the SeNB 2.

As shown in FIG. 1, some embodiments provides MeNB change 101 in which, while the SeNB 2 provides an SCG for DC to the UE 4 in cooperation with the eNB (MeNB) 1, the MeNB in DC for the UE 1 is changed from the eNB 1 to the eNB 3. After the MeNB change, the UE 4 is configured with DC by the MeNB 3 and simultaneously uses an MCG including a cell 31 provided by the MeNB 3 and an SCG including the cell 21 provided by the SeNB 2. This MeNB change may also be referred to as an inter-MeNB handover. Hereinafter, the eNB 1, which is the MeNB before the MeNB change (or inter-MeNB handover), is referred to as a source MeNB (S-MeNB) and eNB 3, which is the MeNB after the MeNB change (or inter-MeNB handover), is referred to as a target MeNB (T-MeNB).

Each of the eNBs 1 to 3 shown in FIG. 1 may be a Baseband Unit (BBU) used in the Centralized Radio Access Network (C-RAN) architecture. In other words, each eNB shown in FIG. 1 may be a RAN node to be connected to one or more Remote Radio Heads (RRHs). In some implementations, each of the eNBs 1 to 3, which is a BBU, is in charge of control-plane processing and digital baseband signal processing for the user plane. On the other hand, each RRH is in charge of analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as Radio Equipment (RE), a Radio Unit (RU), or a Remote Radio Unit (RRU).

FIGS. 2A and 2B show an example (procedure 200) of an overall procedure of an MeNB change (or inter-MeNB handover) according to some embodiments. As described later, the inter-MeNB handover procedure 200 contains a procedure corresponding to the SeNB Addition procedure of 3GPP Release 12 (i.e., Steps 202 and 203). That is, the procedure 200 is an MeNB change (or inter-MeNB handover) procedure involving the addition of an SeNB while Dual Connectivity is provided to the UE 4. In other words, the procedure 200 is an MeNB change (or inter-MeNB handover) procedure without involving the release of the SeNB 2 while Dual Connectivity is provided to the UE 4.

In Step 201, the S-MeNB 1 requests the T-MeNB 3 to perform an inter-MeNB handover of the UE 4. The handover request message in Step 201 may also be referred to as an MeNB change request message.

In Step 202, in response to receiving the handover request message in Step 201, the T-MeNB 3 sends an SeNB addition request message to the SeNB 2. The SeNB addition request message may be referred to as an SCG addition request message. The SeNB Addition Request message indicates characteristics of a radio access bearer(s) (i.e., E-UTRAN Radio Access Bearer(s) (E-RAB(s))) and requests the SeNB 2 to allocate radio resources for the specific E-RAB(s). The characteristics of the E-RAB(s) indicate, for example, an E-RAB identifier (E-RAB ID) and a bearer type (i.e., SCG bearer or split bearer). The bearer type is also referred to as a DRB type. The SeNB Addition Request message may further include information needed for SCG configuration (SCG-ConfigInfo) containing an MCG Configuration and UE capabilities.

As described in detail in the following embodiments, the SeNB Addition Request message (Step 202) may instruct the SeNB 2 such that a part of bearers (i.e., SCG bearer(s) or split bearer(s) or both) that have been configured in the SeNB 2 are to be kept at the SeNB 2 and the rest of the bearers are to be moved to the T-MeNB 3 or released.

In response to receiving the SeNB Addition Request message from the T-MeNB 3, the SeNB 2 prepares radio resources and control-plane (C-plane) resources and prepares transport network resources regarding the SCG bearer. The SeNB 2 then sends a response message (i.e., SeNB Addition Request Acknowledge) containing the SCG configuration (SCG-Config) to the T-MeNB 3 (Step 203). The SCG-Config may include a RadioResourceConfigDedicatedSCG IE containing, for example, a pSCellToAddMod IE.

In Step 204, the T-MeNB 3 sends, to the S-MeNB 1, a response message (i.e., Handover Request Acknowledge) indicating acceptance of the handover request. In Step 205, in response to receiving the Handover Request Acknowledge message, the S-MeNB 1 sends an SeNB Release Request message to the SeNB 2. The SeNB Release Request message may be referred to as an SCG Release Request message.

In Step 206, the S-MeNB 1 requests the UE 4, in the PCell (e.g., the cell 11) in the MCG, to reconfigure the Radio Resource Control (RRC) connection. The RRC Connection Reconfiguration message in Step 206 includes: mobility control information (Mobility Control Info) and MCG configuration regarding the T-MeNB 3; and configuration information regarding the SCG in the SeNB 2 (SCG Configuration, i.e., scg-ConfigPartMCG (e.g., scg-Counter) and scg-ConfigPartSCG). In this way, the UE 4 considers that it has been instructed to perform an Inter-eNB Handover to change the master base station in DC from the S-MeNB 1 to the T-MeNB 3 while keeping the connection (i.e., at least one bearer (SCG bearer or Split bearer)) to the SCG in the SeNB 2. Further, the UE 4 is able to determine which one of the bearers in the SCG is to be kept and which one is to be released. For example, upon receiving the RRC Connection Reconfiguration message, the UE 4 resets the MAC entity for the MCG (MCG MAC) and the MAC entity for the SCG (SCG MAC). The UE 4 then reestablishes the PDCP entity for the MCG (MCG PDCP) and, in the case of the SCG bearer, also reestablishes the PDCP entity for the SCG (SCG PDCP) corresponding to the SCG bearer(s) to be kept. After that, the UE 4 reestablishes the RLC entity for the MCG (MCG RLC) and the RLC entity for the SCG (SCG RLC) corresponding to the kept SCG bearer(s).

In Steps 207 and 208, the UE 4 performs a random access procedure to acquire synchronization with the T-MeNB 3 and then transmits, to the T-MeNB 3, an RRC Connection Reconfiguration Complete message to notify the T-MeNB 3 of the completion of the RRC reconfiguration including a handover confirm and modification (or change) of the MCG and SCG configurations.

In Step 209, the UE 4 performs a random access procedure to acquire synchronization with the SeNB 2 in accordance with the new SCG configuration (including Mobility Control InfoSCG) received through the RRC Connection Reconfiguration message in Step 206.

In Step 210, in response to receiving the RRC Connection Reconfiguration message from the UE 4 (Step 208), the T-MeNB 3 informs the SeNB 2 that the SeNB reconfiguration has been completed (SeNB Reconfiguration Complete message).

In Step 211, the S-MeNB 1 sends a report about a data communication status regarding the MCG (i.e., an SN Status Transfer message) to the T-MeNB 3. The SN Status Transfer message includes, for example, numbers regarding a MCG bearer(s) including: an uplink PDCP Sequence Number (SN); an uplink Hyper Frame Number (HFN); a downlink PDCP Sequence Number; a downlink PDCP Sequence Number; and a downlink Hyper Frame Number. The SN Status Transfer message may include a PDCP sequence number and a hyper frame number regarding a split bearer(s). In Step 212, the S-MeNB 1 starts forwarding the buffered downlink user data, which has been received from an S-GW 5, to the T-MeNB 3.

In Step 213, the SeNB 2 sends a report about a data communication status regarding one or more bearers to be released or to be moved to the T-MeNB 3 among at least one bearer for the UE 4 configured in the SeNB 2 (i.e., an SN Status Transfer message) to the T-MeNB 3. This SN Status Transfer message includes, for example, numbers regarding a SCG bearer(s) including: an uplink PDCP Sequence Number (SN); an uplink Hyper Frame Number (HFN); a downlink PDCP Sequence Number; and a downlink Hyper Frame Number. This SN Status Transfer message may include a PDCP Sequence Number and a Hyper Frame Number regarding a split bearer(s).

In Step 214, the SeNB 2 starts forwarding the buffered downlink user data, which has been received from the S-GW 5, to the T-MeNB 3. The SN Status Transfer (Step 213) and the data forwarding (Step 214) by the SeNB 2 may be initiated in response to the reception of the SeNB Release Request message (Step 205) from the S-MeNB 1, or may be initiated after the transmission of the SeNB Addition Request Acknowledge message to the T-MeNB 3 (Step 203).

In Step 215, the T-MeNB 3 initiates an S1 path switch procedure. In the S1 path switch procedure of Steps 215 to 219, one or more S1 bearers (217) are configured between the S-GW 5 and the T-MeNB 3 for the MCG bearer(s) (and optionally for the split bearer(s)), and one or more S1 bearers (218) are configured between the S-GW 5 and the SeNB 2 for the SCG bearer(s). If there is no modification of the SCG bearer(s) (E-RAB(s)), the configuration of the S1 bearer(s) (218) between the S-GW 5 and the SeNB 2 may be the same as that before the inter-MeNB handover is initiated. For example, the S1 path switch procedure may be omitted.

In Step 220, the T-MeNB 3 sends a UE Context Release message to the S-MeNB 1 to initiate a UE Context Release procedure. Upon receiving the UE Context Release message (Step 220) from the T-MeNB 3, the S-MeNB 1 is allowed to release the radio resources and C-plane resources associated with the UE context. In Step 221, in response to receiving the UE Context Release message from the T-MeNB 3, the S-MeNB 1 sends an UE Context Release message to the SeNB 2.

Some embodiments will be described below. These embodiments may be used individually, or two or more of the embodiments may be appropriately combined with one another. These embodiments are provided for the purpose of illustration.

First Embodiment

In the MeNB change procedure shown in FIGS. 2A and 2B, it may be preferable to perform control such that, while a part of bearers (i.e., SCG bearer(s) or split bearer(s) or both) that have already been configured in the SeNB 2 for Dual Connectivity (DC) are kept at the SeNB 2, the rest of the bearers are moved to the T-MeNB 3 or released. This embodiment provides an improvement of the SeNB Addition Request message (Step 202) to perform, in the MeNB change procedure, partial release or partial keeping of bearers that have been configured in the SeNB 2.

Figure 3:
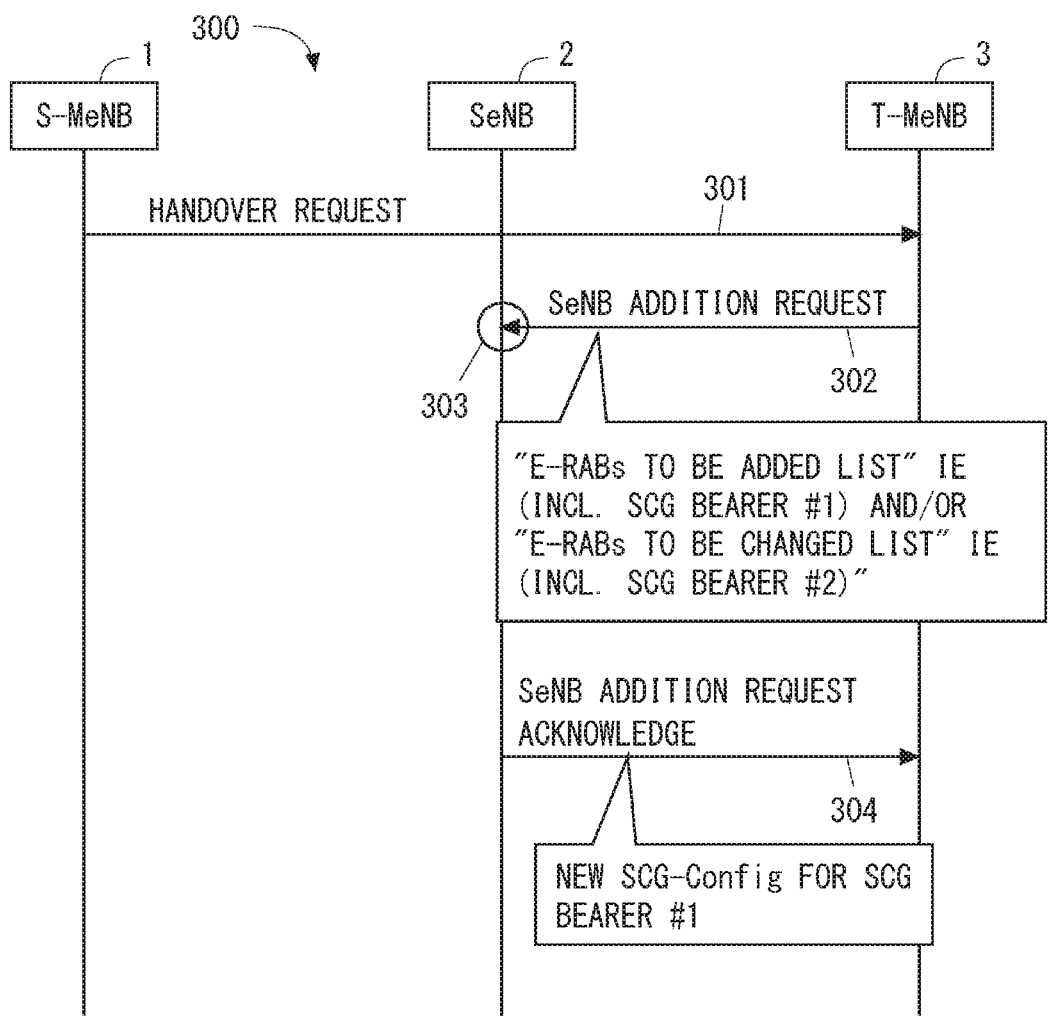
FIG. 3 is a sequence diagram for describing operations of a T-MeNB and an SeNB according to a first embodiment.

FIG. 3 shows an example of a procedure (procedure 300) in which, while providing a specific UE 4 with an SCG for DC in cooperation with the MeNB (S-MeNB) 1, the SeNB 2 receives an SeNB Addition Request message from another eNB (T-MeNB) 3. Steps 301 and 302 shown in FIG. 3 correspond to Steps 201 and 202 shown in FIG. 2A. That is, in Step 301, the S-MeNB 1 sends to the T-MeNB 3 a handover request message to request an inter-MeNB handover of the UE 4. The handover request message includes, for example, the MCG SCG configurations before the handover.

The handover request message (Step 301) may further include one or more additional information elements to explicitly or implicitly indicate from the S-MeNB 1 to the T-MeNB 3 that it is MeNB change involving keeping the SeNB (or the SCG or a bearer(s) in the SCG (SCG bearer or split bearer)). Accordingly, upon receiving the handover request from the S-MeNB 1, the T-MeNB 3 can consider that it has been requested to perform the MeNB change (or inter-MeNB handover) involving keeping the SeNB (or the SCG or a bearer(s) in the SCG (SCG bearer or split bearer)).

In some implementations, in order to implicitly indicate the change of the MeNB in DC for the UE 4, the additional information element(s) contained in the handover request message (Step 301) may include a radio terminal identifier (i.e., SeNB UE X2AP ID) that is allocated by the SeNB 2 to uniquely identify the UE 4 on the inter-base station interface (i.e., X2 interface) between the S-MeNB 1 and the SeNB 2. The additional information element(s) may further include the one or more bearer identifiers for the UE 4 (e.g., network-bearer identifier (i.e., E-RAB ID or eps-Bearer Identity), or identifier of Data Radio Bearer (DRB) (i.e., DRB Identity), or a combination thereof) that are already configured in the SeNB 2 for DC in cooperation with the S-MeNB 1.

Additionally or alternatively, in some implementations, in order to implicitly indicate the change of the MeNB in DC for the UE 4, the additional information element(s) contained in the handover request message (Step 301) may include a terminal identifier (e.g., Cell-Radio Network Temporary Identifier (C-RNTI)) allocated to the UE 4 by the SeNB 2 to uniquely identity the UE 4 within the SCG. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1. In this case, the E-RAB ID may be transmitted as an information element of the X2 message, and meanwhile the eps-Bearer Identity and the DRB Identity may be contained as information elements in the RRC layer within a container (i.e., MeNB to SeNB Container) that is contained in the X2 message.

Additionally or alternatively, in some implementations, the additional information element(s) contained in the handover request message (Step 301) may explicitly indicate that the MeNB in DC for the UE 4 is to be changed from the MeNB (S-MeNB) 1 to the MeNB (T-MeNB) 3. In this case, the additional information element(s) may indicate that there is no change in the one or more bearer identifiers for the UE 4 (e.g., E-RAB ID or eps-Bearer Identity, or DRB Identity, or a combination thereof) that are already configured in the SeNB 2 for DC in cooperation with the MeNB 1.

In Step 302, in response to receiving the handover request message in Step 301, the T-MeNB 3 sends an SeNB Addition Request message to the SeNB 2. The SeNB Addition Request message indicates characteristics of a radio access bearer(s) (i.e., E-UTRAN Radio Access Bearer(s) (E-R-AB(s))) and requests the SeNB 2 to allocate radio resources for the specific E-RAB(s). The characteristics of the E-RAB(s) indicate, for example, an E-RAB identifier (E-RAB ID) and a bearer type (i.e., SCG bearer or split bearer). The bearer type is also referred to as a DRB type. The SeNB Addition Request message may further include information needed for SCG configuration (SCG-ConfigInfo) containing an MCG Configuration and UE capabilities. Further, the T-MeNB 3 may specify, in the SCG-ConfigInfo, a network-bearer identifier (e.g., eps-Bearer Identity) and a data-radio-bearer identifier (e.g., DRB Identity) that have the same values as those used in DC between the S-MeNB 1 and the SeNB 2. Likewise, the T-MeNB 3 may specify a logical identifier of the cell 21(e.g., sCellIndex or ServCellIndex) having the same value as that used in DC between the S-MeNB 1 and the SeNB 2.

The SeNB Addition Request message (Step 302) may further include one or more additional information elements to explicitly or implicitly indicate to the SeNB 2 that the MeNB is to be changed from the S-MeNB 1 to the T-MeNB 3 while the SeNB (or the SCG or a bearer(s) for the SCG (SCG bearer or split bearer)) is maintained. The one or more additional information element(s) may be the same as, or may be derived from, the corresponding additional information element(s) included in the handover request message (Step 301).

Specifically, in some implementations, in order to implicitly indicate the change of the MeNB in DC for the UE 4, the additional information element(s) contained in the SeNB Addition Request message (Step 302) may include a radio terminal identifier (i.e., SeNB UE X2AP ID) that is allocated by the SeNB 2 to uniquely identity the UE 4 on the inter-base station interface (i.e., X2 interface) between the S-MeNB 1 and the SeNB 2. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1.

Additionally or alternatively, in some implementations, in order to implicitly indicate the change of the MeNB in DC for the UE 4, the additional information element(s) contained in the SeNB Addition Request message (Step 302) may include a terminal identifier (e.g., C-RNTI) allocated to the UE 4 by the SeNB 2 to uniquely identity the UE 4 within the SCG. In this case, the additional information element(s) may further include the one or more bearer identifiers for the UE 4 (e.g., E-RAB ID or eps-Bearer Identity, or DRB Identity, or a combination thereof) that are already configured in the SeNB 2 for DC in cooperation with the S-MeNB 1.

Additionally or alternatively, in some implementations, the additional information element(s) contained in the SeNB Addition Request message (Step 302) may explicitly indicate that the MeNB in DC for the UE 4 is to be changed from the MeNB (S-MeNB) 1 to the MeNB (T-MeNB) 3. For example, the SeNB Addition Request message may include an SCG Change Indication IE. Further, a new Cause value (e.g., "Inter MeNB Handover" or "SeNB (SCG) Stored Handover") may be defined for the SCG Change Indication IE, and the SeNB Addition Request message may specify this Cause value. Furthermore, in this case, the additional information element(s) may indicate that there is no change in the bearer identifier(s) (e.g., E-RAB ID or eps-Bearer Identity, or DRB Identity, or a combination thereof) for the UE 4 that are already configured in the SeNB 2 for DC in cooperation with the MeNB 1.

The SeNB Addition Request message (Step 302) further indicates whether each of at least one bearer that has already been configured in the SeNB 2 for DC is to be kept or not at the SeNB 2. In other words, the SeNB Addition Request message indicates whether each bearer that has already been configured in the SeNB 2 is to be kept at the SeNB 2 after the MeNB change or to be released (or to be moved as to the T-MeNB 3 an MCG bearer). That is, the SeNB Addition Request message enables the SeNB 2 to distinguish one or more first bearers to be kept at the SeNB 2 from one or more second bearers that do not need to be kept at the SeNB 2 (or that are moved to the T-MeNB 3).

In some implementations, the SeNB Addition Request message may indicate, on a per bearer basis, whether at least one bearer that has already been configured in the SeNB 2 is to be kept at the SeNB 2 after the MeNB change or to be released (or to be moved to the T-MeNB 3 as an MCG bearer(s)). More specifically, the SeNB Addition Request message may contain a first list indicating one or more first bearers (e.g., an SCG bearer(s) #1) to be kept at the SeNB 2 after the MeNB change, or a second list indicating one or more second bearers (e.g., an SCG bearer(s) #2) that do not need to be kept at the SeNB 2 after the MeNB change, or both lists. The second list may indicate one or more second bearers to be moved from the SeNB 2 to the T-MeNB 3 as an MCG bearer(s).

As shown in FIG. 3, in one example, the first list may be defined as an "E-RAB To Be Added List" information element (IE). On the other hand, the second list may be defined as an "E-RAB To Be Changed List" information element (IE). Alternatively, the second list may be defined as an "E-RAB To Be Released List" information element (IE) or an "E-RAB To Be Reconfigured List" information element (IE).

In Step 303, the SeNB 2 is configured to, upon receiving the SeNB Addition Request message (Step 302) including the above-described additional information element(s) while providing the specific UE 4 with the SCG for DC in cooperation with the MeNB (S-MeNB) 1, consider that the SeNB Addition Request message requests modification (or change) of the configuration regarding the SCG that has already been configured for the DC in cooperation with the S-MeNB 1. The modification (or change) of the configuration regarding the SCG includes, for example, at least one of: (a) modification (or change) of the configuration of the MeNB associated with the SCG (e.g., MeNB UE X2AP ID); (b) modification (or change) of the configuration of the MCG or MCG bearer(s) associated with the SCG; (c) modification (or change) of an SeNB security key (S-KeNB); and (d) modification (or change) of the configuration of the SCG or SCG bearer(s) or split bearer(s). As a more specific example, if the E-RAB To Be Added List IE contained in the SeNB Addition Request message includes a radio terminal identifier (e.g., SeNB UE X2AP ID) having the same value as that configured for the UE 4 that is currently performing DC with the S-MeNB 1 and also includes an E-RAB ID having the same value as that configured for the UE 4, the SeNB 2 regards this SeNB Addition Request as a request for modification (or change) of the configuration corresponding to this E-RAB or a request for reconfiguration of the SCG including this E-RAB.

Further, in Step 303, the SeNB 2 is configured to distinguish the one or more first bearers (e.g., SCG bearer(s) #1), which are to be kept at the SeNB 2, from the one or more second bearers (e.g., SCG bearer(s) #2), which do not need to be kept at the SeNB 2 (or are moved to the T-MeNB 3), based on the SeNB Addition Request message in Step 302.

In one example, the SeNB Addition Request message (Step 302) includes both the above-described first list (e.g., the E-RAB To Be Added List) and the second list (e.g., the E-RAB To Be Changed List). In this case, the SeNB 2 considers that it should keep the one or more bearers included in the first list and the SeNB 2 also considers that the one or more bearers included in the second list are allowed to be released or are to be moved to the T-MeNB 3.

In another example, the SeNB Addition Request message (Step 302) includes the above-described first list (e.g., the E-RAB To Be Added List), but it does not need to include the second list (e.g., the E-RAB To Be Changed List). In this case, the SeNB 2 may consider that the one or more bearers not included in the first list are allowed to be released or are moved to the T-MeNB 3.

In yet another example, the SeNB Addition Request message (Step 302) includes the above-described second list (e.g., the E-RAB To Be Changed List), but it does not need to include the first list (e.g., the E-RAB To Be Added List). In this case, the SeNB 2 may consider that it should keep the one or more bearers not included in the second list.

In Step 304, the SeNB 2 creates new SCG configuration (SCG-Config) based on the information (e.g., the SCG-ConfigInfo) included in the SeNB Addition Request message (Step 302) from the T-MeNB 3 and sends a response message (i.e., SeNB Addition Request Acknowledge) including the new SCG configuration to the T-MeNB 3. The new SCG configuration is related to one or more first bearers (e.g., SCG bearer(s) #1) which the T-MeNB 3 has instructed the SeNB 2 to keep. The new SCG configuration may include the terminal identifier (C-RNTI) allocated by the SeNB 2 to the UE 4 to uniquely identify the UE 4 within the SCG. The SeNB 2 may always add the C-RNTI to the "MobilityControlInfoSCG" information element in the case of the SCG modification (or change), SCG re-establishment, or SCG relocation (or SCG relocated) due to the MeNB change, in addition to the case of the SCG establishment.

The SeNB 2 and T-MeNB 3 may operate as follows under abnormal conditions regarding the procedure shown in FIG. 3. If the radio terminal identifier (i.e., SeNB UE X2AP ID) indicated by the SeNB Addition Request message (Step 302) is not used to uniquely identify the UE 4 on the inter-base station interface (i.e., X2 interface) between the S-MeNB 1 and the SeNB 2, the SeNB 2 may send an SeNB Addition Request Reject message instead of the SeNB Addition Request Acknowledge message (Step 304). The SeNB Addition Request Reject message indicates that the SeNB Addition Request message (Step 302) cannot be accepted. The SeNB Addition Request Reject message may include a Cause value (e.g., "Inappropriate X2AP ID") indicating that the requested radio terminal identifier (i.e., SeNB UE X2AP ID) is inappropriate.

Alternatively, if the SeNB 2 does not support the function required for the inter-eNB handover of the DC UE while the SCG is maintained, the SeNB Addition Request Reject message may include a Cause value (e.g., "Bearer Keeping Option Not Supported" or "Bearer Keeping Handover Not supported") indicating that this function is not supported.

Further alternatively, when the SeNB 2 does not support the function required for the inter-eNB handover of the DC UE that involves, while keeping, at the SeNB 2, a part of bearers that have been configured in the SeNB 2, transferring the rest of the bearers to the T-MeNB 3 or releasing the rest of the bearers, the SeNB Addition Request Reject message may include a Cause value (e.g., "Bearer Keeping Option Not Supported" or "Bearer Keeping Handover Not supported") indicating that this function is not supported.

In response to receiving the SeNB Addition Request Reject message, the T-MeNB 3 may send, to the S-MeNB 1, a response message (i.e., Handover Preparation Failure message) indicating that the handover cannot be accepted. Alternatively, the T-MeNB 3 may include the E-RAB ID(s) of the bearer(s) in the SeNB (SCG bearer or split bearer) into the "E-RABs Not Admitted List" IE contained in the Handover Request Acknowledge message. In this case, the S-MeNB 1 may release the SCG or change the SCG bearer(s) to the MCG bearer(s) before transmitting a handover command (i.e., RRC Connection Reconfiguration containing Mobility Control Info) to the UE 4 or after stopping (suspending) the handover.

Figure 4:
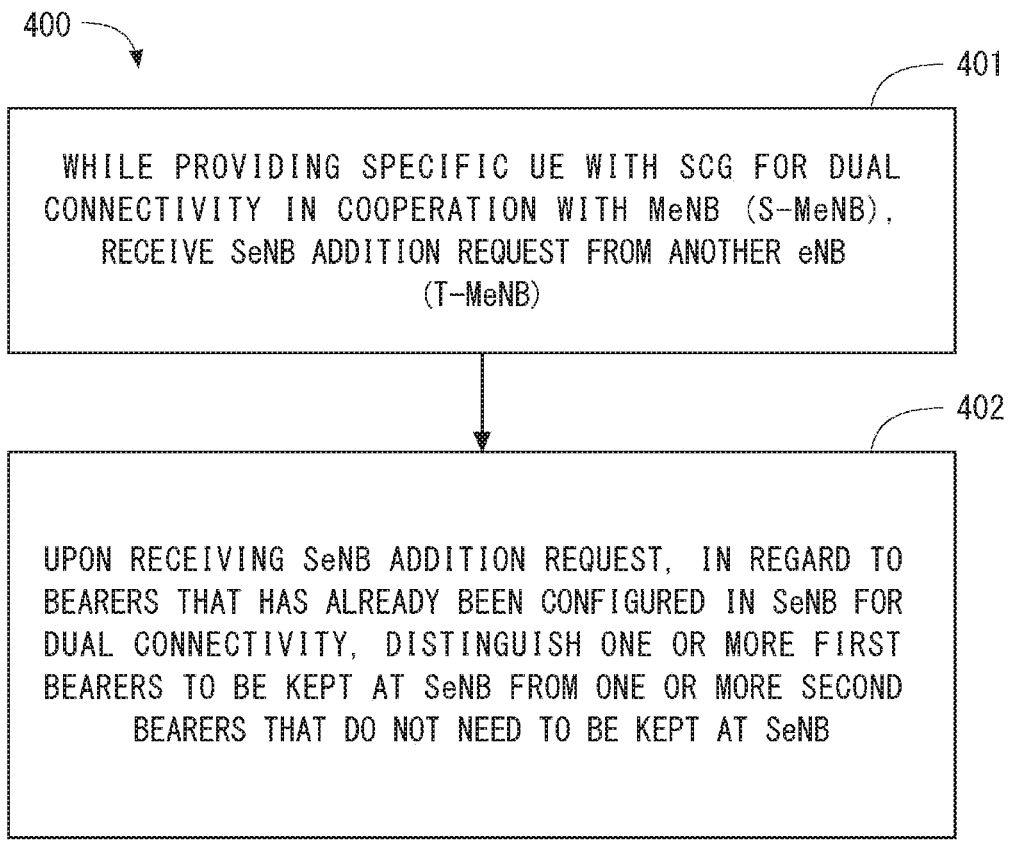
FIG. 4 is a flowchart showing an example of an operation of the SeNB according to the first embodiment.

FIG. 4 is a flowchart showing an example (operation 400) of the operation of the SeNB 2. In Block 401, while providing a specific UE 4 with an SCG for DC in cooperation with the MeNB (S-MeNB) 1, the SeNB 2 receives an SeNB Addition Request message from another eNB (T-MeNB) 3. In Block 402, upon receiving the SeNB Addition Request message, the SeNB 2 distinguishes one or more first bearers to be kept at the SeNB 2 from one or more second bearers that do not need to be kept at the SeNB 2 (or moved to the T-MeNB 3), in regard to the at least one bearer that has already been configured in the SeNB 2 for DC in cooperation with the S-MeNB 1.

As can be understood from the above descriptions, according to the example described with reference to FIGS. 3 and 4, the T-MeNB 3 is able to inform the SeNB 2 of, on a per bearer basis, whether at least one bearer that has already been configured in the SeNB 2 for DC is to be kept at the SeNB 2 after the MeNB change or is allowed to be released (or is to be moved to the T-MeNB 3). Upon receiving the SeNB Addition Request message from the T-MeNB 3, the SeNB 2 can determine on a per bearer basis whether the at least one bearer, which has already been configured in the SeNB 2 for DC, is to be kept after the MeNB change or is allowed to be released (or is to be moved to the T-MeNB 3).

Hereinafter, a specific example of modification of the SeNB Addition Request message will be described with reference to FIGS. 5A and 5B. FIGS. 5A and 5B show an example of modification of the SeNB Addition Request message described in Section 9.1.3.1 of Non Patent Literature 2. The "E-RAB To Be Changed List" IE is used by the T-MeNB 3 to notify the SeNB 2 of one or more bearers that do not need to be kept at the SeNB 2 (or are to be moved to the T-MeNB 3) after the MeNB change among the at least one bearer that has already been configured in the SeNB 2 for DC.

The "E-RABs To Be Changed List" IE contains an "E-RABs To Be Changed Item" IE. The "E-RABs To Be Changed Item" IE contains "E-RAB ID", "DL Forwarding GTP Tunnel Endpoint", and "UL Forwarding GTP Tunnel Endpoint" IEs regarding an SCG Bearer. The "DL Forwarding GTP Tunnel Endpoint" IE indicates an endpoint configuration (i.e., Transport Network Layer (TNL) address and Tunnel Endpoint Identifier (TEID)) of the T-MeNB 3 regarding an X2 transport bearer for forwarding DL data (DL PDUs). The "UL Forwarding GTP Tunnel Endpoint" IE indicates an endpoint configuration (i.e., TNL address and TEID) of the T-MeNB 3 regarding an X2 transport bearer for forwarding UL data (UL PDUs). Likewise, the "E-RABs To Be Changed Item" IE includes "E-RAB ID" and "DL Forwarding GTP Tunnel Endpoint" IEs regarding a split Bearer.

As already described, the name "E-RAB To Be Changed List" IE is an example. Instead of "E-RAB To Be Changed List" IE, for example, the name "E-RAB To Be Released List" IE or "E-RAB To Be Reconfigured List" IE may be used.

Second Embodiment

This embodiment provides an improvement of the Handover Request Acknowledge message (Step 204) to make it possible, in the MeNB change procedure, to release or keep a part of bearers that has been configured in the SeNB 2.

Figure 6:
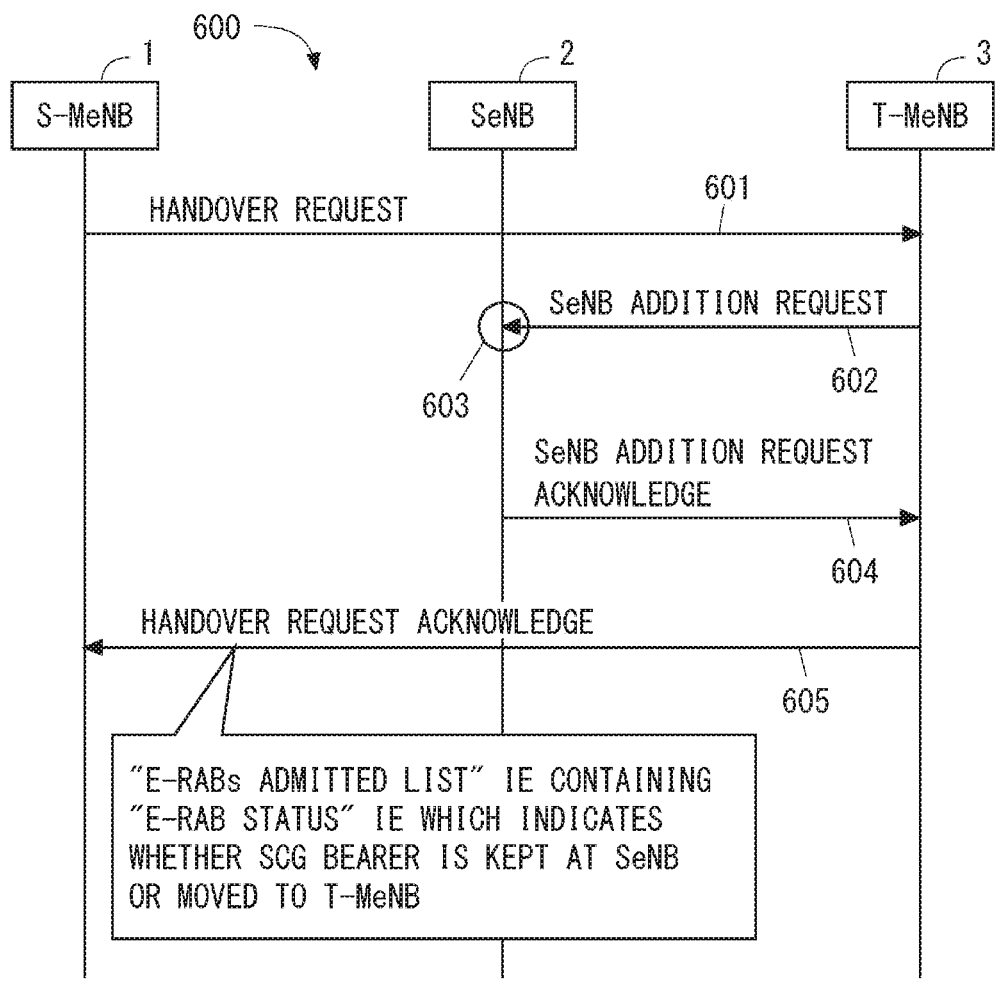
FIG. 6 is a sequence diagram for describing operations of a T-MeNB and an S-MeNB according to a second embodiment.

FIG. 6 shows an example (procedure 600) of a procedure in which the T-MeNB 3 sends a Handover Request Acknowledge message to the S-MeNB 1 after receiving an SeNB Addition Request Acknowledge message from the SeNB 2. Steps 601 to 604 shown in FIG. 6 are similar to Steps 301 to 304 shown in FIG. 3. Step 605 shown in FIG. 6 corresponds to Step 204 shown in FIG. 2A. That is, in Step 605, the T-MeNB 3 sends, to the S-MeNB 1, a response message (i.e., Handover Request Acknowledge) indicating acceptance of the handover request in Step 501.

The Handover Request Acknowledge message (Step 605) indicates whether each of at least one bearer that has already been configured in the SeNB 2 for DC in cooperation with the S-MeNB 1 is to be kept at the SeNB 2. In other words, the Handover Request Acknowledge message indicates whether each of the at least one bearer, which has already been configured in the SeNB 2, is to be kept at the SeNB 2 or to be moved to the T-MeNB 3. That is, the Handover Request Acknowledge message enables the S-MeNB 1 to distinguish one or more first bearers to be kept at the SeNB 2 from one or more second bearers to be moved to the T-MeNB 3.

In some implementations, the Handover Request Acknowledge message may indicate, on a per bearer basis, whether the at least one bearer, which has already been configured in the SeNB 2, is to be kept at the SeNB 2 after the MeNB change or to be moved to the T-MeNB 3 as an MCG bearer. More specifically, the Handover Request Acknowledge message may contain a third list and a bearer status information element. The third list indicates one or more bearers admitted by the T-MeNB 3. The bearer status information element explicitly indicates whether each bearer included in the third list is to be kept at the SeNB 2 or to be moved to the T-MeNB 3.

As shown in FIG. 6, in one example, the third list may be defined as an "E-RAB Admitted List" information element (IE), and the bearer status information element may be defined as an "E-RAB Status" information element (IE). The "E-RAB Status" IE explicitly indicates whether each bearer (e.g., SCG bearer) that has been configured in the SeNB 2 for DC with the S-MeNB 1 is to be kept at the SeNB 2 or to be moved to the T-MeNB 3. Alternatively, the bearer status information element may be defined as at least one of an "E-RAB Kept" IE indicating that a bearer is to be kept at the SeNB 2 and an "E-RAB Relocated (Switched)" IE indicating that a bearer is to be moved to the T-MeNB 3.

In another example, the Handover Request Acknowledge message may include the above-mentioned third list and a tunnel endpoint identifier(s) (TEID(s)) implicitly indicating whether each bearer included in the third list is to be kept at the SeNB 2 or to be moved to the T-MeNB 3. The tunnel endpoint identifier is a TEID of an X2 transport bearer for data forwarding regarding a bearer(s) that is to be moved from the SeNB 2 to the T-MeNB 3. If the third list contains a bearer identity (E-RAB) of a certain bearer but it does not contain a TEID associated with this bearer, the S-MeNB 1 may consider that this bearer is to be kept at the SeNB 2.

Figure 7:
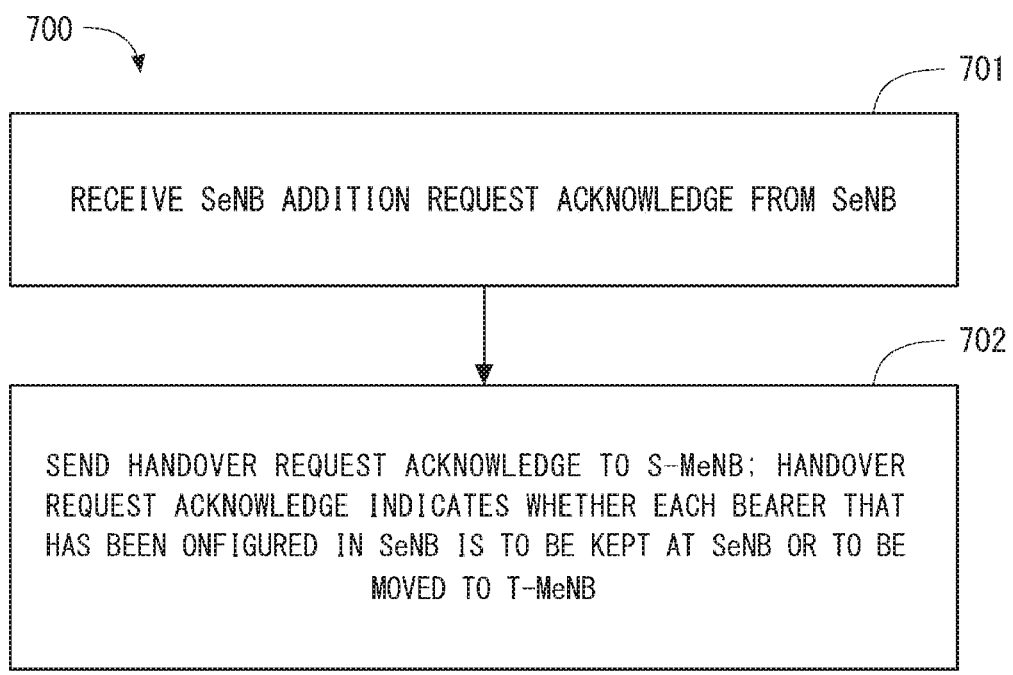
FIG. 7 is a flowchart showing an example of the operation of the T-MeNB according to the second embodiment.

FIG. 7 is a flowchart showing an example (operation 700) of the operation of the T-MeNB 3. In Block 701, the T-MeNB 3 receives an SeNB Addition Request Acknowledge message from the SeNB 2. In Block 702, the T-MeNB 3 sends a Handover Request Acknowledge message to the S-MeNB 1. The Handover Request Acknowledge message explicitly or implicitly indicates whether each bearer that has been configured in the SeNB 2 is to be kept at the SeNB 2 or to be moved to the T-MeNB 3.

As can be understood from the above description, according to the example described with reference to FIGS. 6 and 7, the T-MeNB 3 is able to inform the S-MeNB 1 of, on a per bearer basis, whether at least one bearer that has already been configured in the SeNB 2 for DC is to be kept at the SeNB 2 after the MeNB change or to be moved to the T-MeNB 3. Upon receiving the Handover Request Acknowledge message from the T-MeNB 3, the S-MeNB 1 can determine on a per bearer basis whether the at least one bearer, which has already been configured in the SeNB 2 for DC, is to be kept at the SeNB 2 after the MeNB change or to be moved to the T-MeNB 3.

Hereinafter, a specific example of modification of the Handover Request Acknowledge message will be described with reference to FIG. 8. FIG. 8 shows an example of modification of the Handover Request Acknowledge message described in Section 9.1.1.2 of Non Patent Literature 2. The "E-RAB Status" IE explicitly indicates whether each bearer (e.g., SCG bearer) configured in the SeNB 2 for DC with the S-MeNB 1 is to be kept at the SeNB 2 or to be moved to the T-MeNB 3.

Third Embodiment

This embodiment provides an improvement of the SeNB Release Request message (Step 205) to make it possible, in the MeNB change procedure, to release or keep a part of bearers that has been configured in the SeNB 2.

Figure 9:
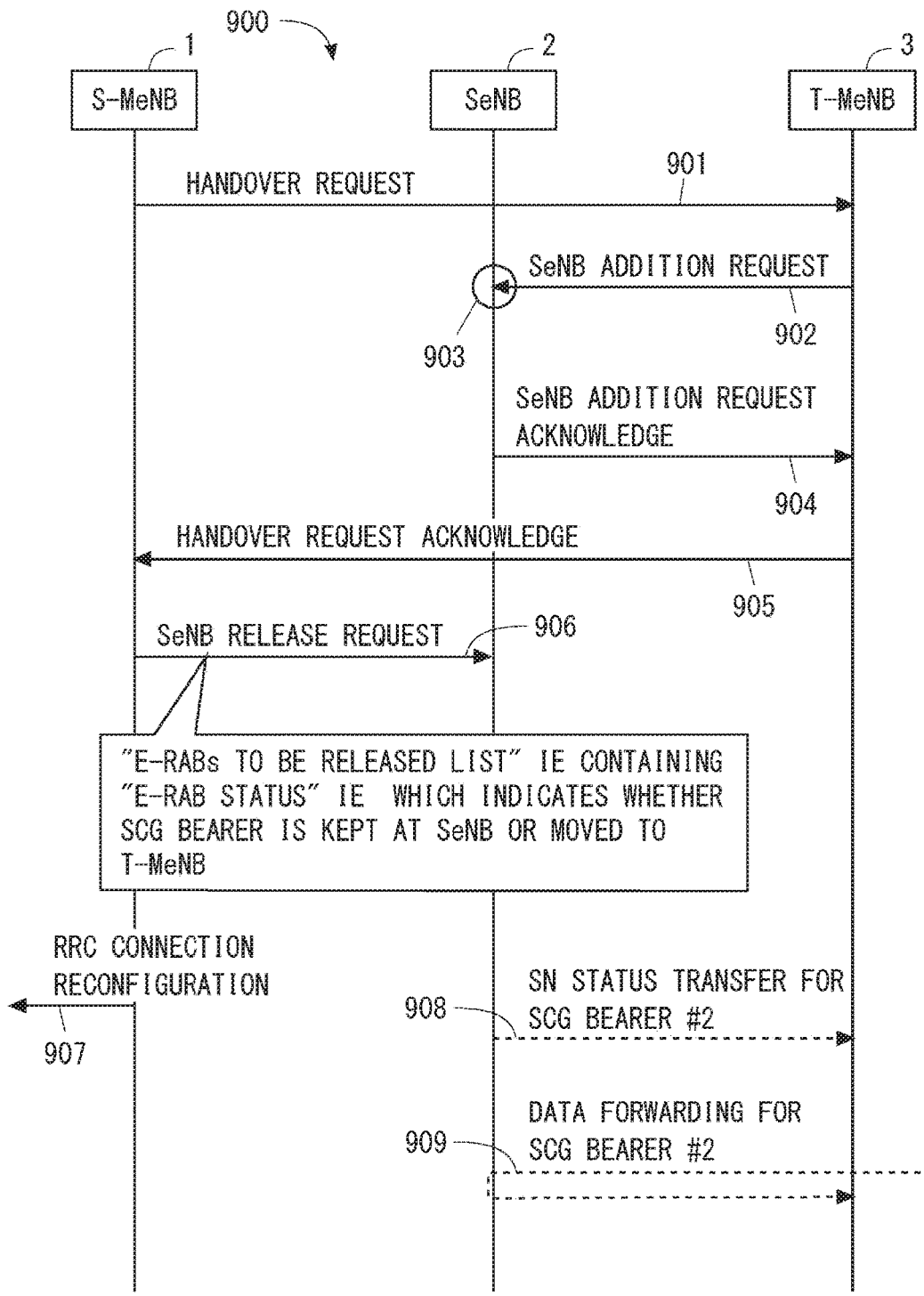
FIG. 9 is a sequence diagram for describing operations of an S-MeNB and an SeNB according to a third embodiment.

FIG. 9 shows an example (procedure 900) of a procedure in which the S-MeNB 1 sends an SeNB Release Request message to the SeNB 2 after receiving a Handover Request Acknowledge message from the T-MeNB 3. Steps 901 to 905 shown in FIG. 9 are similar to Steps 601 to 605 shown in FIG. 6. Step 906 shown in FIG. 9 corresponds to Step 205 shown in FIG. 2A. That is, in Step 906, the S-MeNB 1 sends an SeNB Release Request message to the SeNB 2. The SeNB Release Request message triggers the SeNB 2 to release resources (e.g., UE context) regarding the UE 4 for the SeNB in DC with the S-MeNB 1.

The SeNB Release Request message (Step 906) indicates whether each of at least one bearer that has already been configured in the SeNB 2 for DC in cooperation with the S-MeNB 1 is to be kept at the SeNB 2. In other words, the SeNB Release Request message indicates whether each of the at least one bearer, which has already been configured in the SeNB 2, is to be kept at the SeNB 2 or is allowed to be released (or is to be moved to the T-MeNB 3). That is, the SeNB Release Request message enables the SeNB 2 to determine one or more first bearers to be kept at the SeNB 2 and one or more second bearers that are allowed to be released (or moved to the T-MeNB 3).

In some implementations, the SeNB Release Request message may indicate, on a per bearer basis, whether at least one bearer that has already been configured in the SeNB 2 is to be kept at the SeNB 2 after the MeNB change or is allowed to be released. More specifically, the SeNB Release Request message may include a fourth list and a bearer status information element. The fourth list indicates one or more bearers configured in the SeNB 2 for DC with the S-MeNB 1. The bearer status information element explicitly indicates whether each bearer included in the fourth list is to be kept at the SeNB 2 or is allowed to be released (or to be moved to the T-MeNB 3).

As shown in FIG. 9, in one example, the fourth list may be defined as an "E-RAB Released List" information element (IE), and the bearer status information element may be defined as an "E-RAB Status" information element (IE). The "E-RAB Status" IE explicitly indicates whether each bearer (e.g., SCG bearer) that has been configured in the SeNB 2 for DC with the S-MeNB 1 is to be kept at the SeNB 2 or is allowed to be released (or is moved to the T-MeNB 3). Alternatively, the bearer status information element may be defined as at least one of the "E-RAB Kept" IE indicating that a bearer is to be kept at the SeNB 2 and the "E-RAB Released" IE indicating that a bearer is allowed to be released (or is to be moved to the T-MeNB 3).

In another example, the SeNB Release Request message may include the fourth list indicating only one or more bearers that are allowed to be released (i.e., the bearers to be moved to the T-MeNB 3) among the at least one bearer that has been configured in the SeNB 2, but meanwhile the SeNB Release Request message may not include the above-described bearer status information element. In this case, the SeNB 2 can consider that bearers not included in the fourth list should be kept.

Step 907 in FIG. 9 corresponds to Step 206 in FIG. 2A. That is, in Step 907, the S-MeNB 1 transmits, in the PCell (e.g., the cell 11) in the MCG, an RRC Connection Reconfiguration message to the UE 4 to request the UE 4 to reconfigure the radio resource control (RRC) connection. The RRC Connection Reconfiguration message includes: mobility control information (Mobility Control Info) and MCG configuration regarding the T-MeNB 3; and SCG configuration regarding the SeNB 2. These MCG configuration regarding the T-MeNB 3 and the SCG configuration regarding the SeNB 2 indicate whether each of at least one bearer already configured in the SeNB 2 is to be kept at the SeNB 2. In other words, these MCG configuration and SCG configuration indicate whether each bearer that has already been configured in the SeNB 2 is to be kept at the SeNB 2 after the MeNB change or to be moved to the T-MeNB 3 as an MCG bearer. Upon receiving the RRC Connection Reconfiguration message (Step 907), the UE 4 can distinguish one or more bearers to be kept at the SeNB 2 after the MeNB change from one or more bearers to be moved to the T-MeNB 3.

Steps 908 and 909 in FIG. 9 correspond to Steps 213 and 214 in FIG. 2B. That is, in Step 908, the SeNB 2 sends an SN Status Transfer message to the T-MeNB 3. The SN Status Transfer message is related to the one or more bearers (e.g., SCG bearer(s) #2) to be released or moved to the T-MeNB 3 among the at least one bearer that has been configured in the SeNB 2 for the UE 4.

In Step 909, the SeNB 2 starts forwarding the buffered downlink user data, which has been received from the S-GW 5, to the T-MeNB 3. Note that the SN Status Transfer (Step 908) and the data forwarding (Step 909) by the SeNB 2 may be initiated after the transmission of the SeNB Addition Request Acknowledge message (Step 904) to the T-MeNB 3 or may be initiated in response to the reception of the SeNB Reconfiguration Complete message (Step 210) from the T-MeNB 3.

Figure 10:
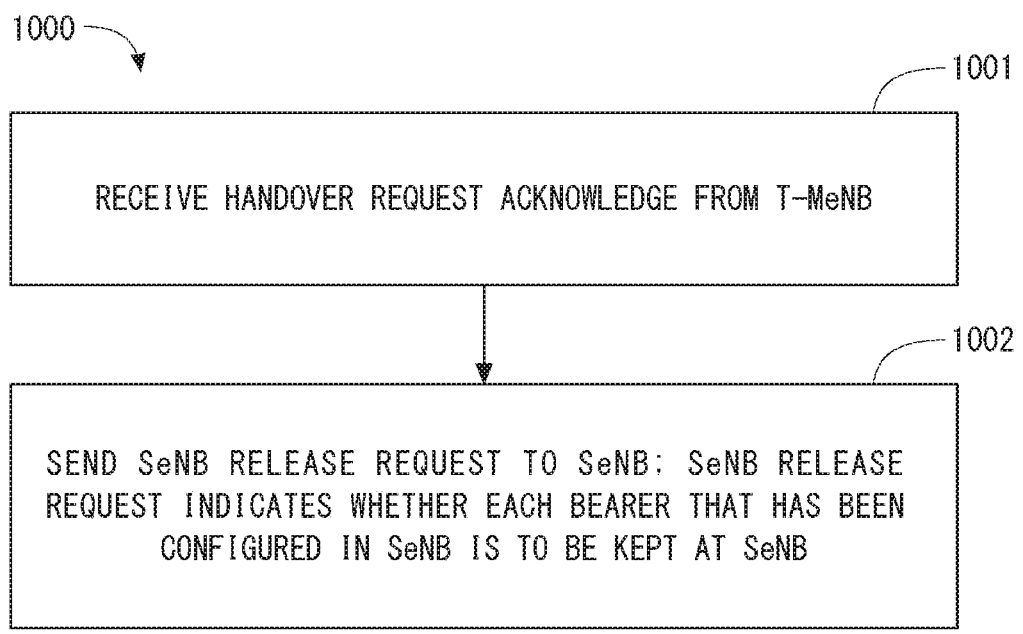
FIG. 10 is a flowchart showing an example of the operation of the S-MeNB according to the third embodiment.

FIG. 10 is a flowchart showing an example (operation 1000) of the operation of the S-MeNB 1. In Block 1001, the S-MeNB 1 receives a Handover Request Acknowledge message from the T-MeNB 3. In Block 1002, the S-MeNB 1 sends an SeNB Release Request message to the SeNB 2. The SeNB Release Request message explicitly or implicitly indicates whether each bearer that has been configured in the SeNB 2 is to be kept at the SeNB 2 or is allowed to be released (or is to be moved to the T-MeNB 3).

As can be understood from the above descriptions, according to the example described with reference to FIGS. 9 and 10, the S-MeNB 1 is able to inform the SeNB 2 of, on a per bearer basis, whether at least one bearer that has already been configured in the SeNB 2 for DC is to be kept at the SeNB 2 after the MeNB change or is allowed to be released (or is to be moved to the T-MeNB 3). Upon receiving the SeNB Release Request message from the S-MeNB 1, the SeNB 2 can determine on a per bearer basis whether the at least one bearer, which has already been configured in the SeNB 2 for DC, is to be kept at the SeNB 2 after the MeNB change or is allowed to be released (or is to be moved to the T-MeNB 3).

Hereinafter, a specific example of modification of the SeNB Release Request message will be described with reference to FIGS. 11A and 11B. FIGS. 11A and 11B show an example of modification of the SeNB Release Request message described in Section 9.1.3.11 of Non Patent Literature 2. The "E-RAB Status" IE explicitly indicates whether each bearer (e.g., SCG bearer) configured in the SeNB 2 for DC with the S-MeNB 1 is to be kept at the SeNB 2 or to be moved to the T-MeNB 3.

Figure 12:
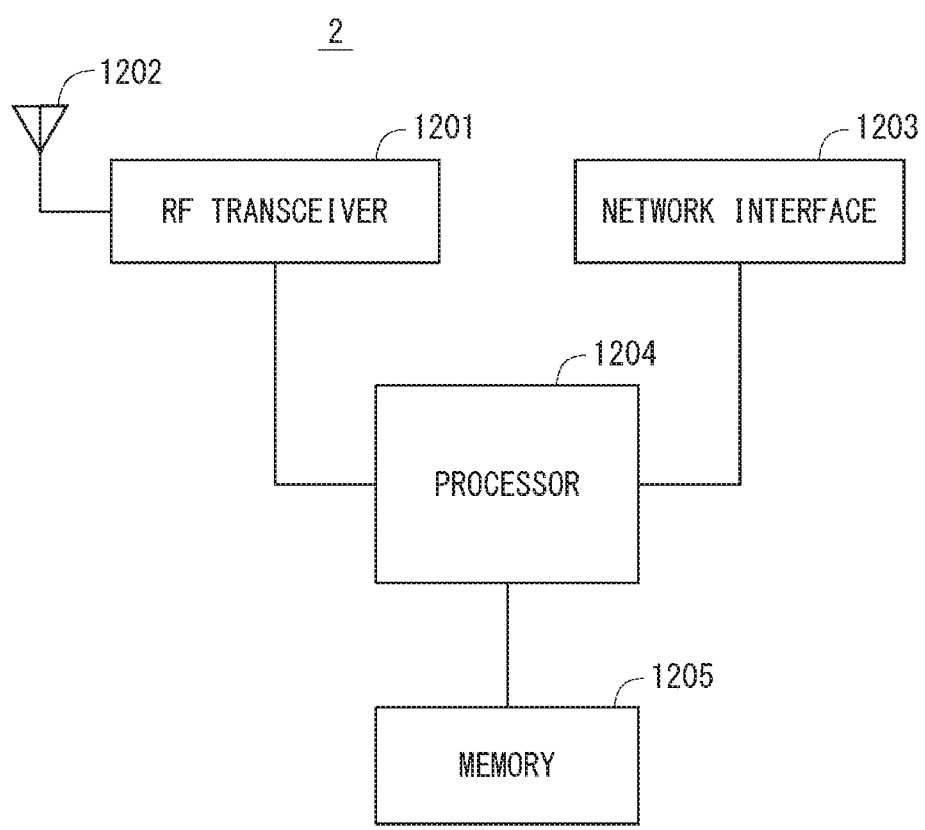
FIG. 12 is a block diagram showing a configuration example of a base station according to some embodiments.

Lastly, configuration examples of the eNB 1, eNB 2, eNB 3, and UE 4 according to the above-described embodiments will be described. FIG. 12 is a block diagram showing a configuration example of the SeNB 2. The S-MeNB 1 and the T-MeNB 3 each may have a configuration similar to the configuration show in FIG. 12. Referring to FIG. 12, the SeNB 2 includes an RF transceiver 1201, a network interface 1203, a processor 1204, and a memory 1205. The RF transceiver 1201 performs analog RF signal processing to communicate with UEs. The RF transceiver 1201 may include a plurality of transceivers. The RF transceiver 1201 is coupled to an antenna 1202 and a processor 1204. The RF transceiver 1201 receives modulation symbol data (or OFDM symbol data) from the processor 1204, generates a transmission RF signal, and supplies the transmission RF signal to the antenna 1202. Moreover, the RF transceiver 1201 generates a baseband reception signal based on a reception RF signal received by the antenna 1202, and supplies the baseband reception signal to the processor 1204.

The network interface 1203 is used to communicate with network nodes (e.g., other eNBs, MMEs, and S-GWs). The network interface 1203 may include, for example, a network interface card (NIC) conforming to the IEEE 802.3 series.

The processor 1204 performs digital baseband signal processing (i.e., data plane processing) and control plane processing for radio communication. For example, in the case of LTE and LTE-Advanced, the digital baseband signal processing performed by the processor 1204 may include signal processing of the PDCP layer, RLC layer, MAC layer, and PHY layer. Further, signal processing performed by the processor 1204 may include signal processing of the GTP-U UDP/IP layer for the X2-U and S1-U interfaces. Further, the control plane processing performed by the processor 1204 may include processing of the X2AP protocol, S1-MME protocol, and RRC protocol.

The processor 1204 may include a plurality of processors. The processor 1204 may include, for example, a modem processor (e.g., DSP) that performs the digital baseband signal processing, a processor (e.g., DSP) that performs the signal processing of the GTP-U UDP/IP layer for the X2-U and S1-U interfaces, and a protocol stack processor (e.g., CPU or MPU) that performs the control plane processing.

The memory 1205 is composed of a combination of a volatile memory and a non-volatile memory. The memory 1205 may include a plurality of physically independent memory devices. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 1205 may include a storage disposed separately from the processor 1204. In this case, the processor 1204 may access the memory 1205 via the network interface 1203 or a not illustrated I/O interface.

The memory 1205 may store a software module(s) (computer program(s)) including instructions and data for processing by the SeNB 2 described in the above embodiments. In some implementations, the processor 1204 may be configured to load the software module(s) from the memory 1205 and execute the loaded software module(s), thereby performing the processing of the SeNB 2 described in the above embodiments.

Figure 13:
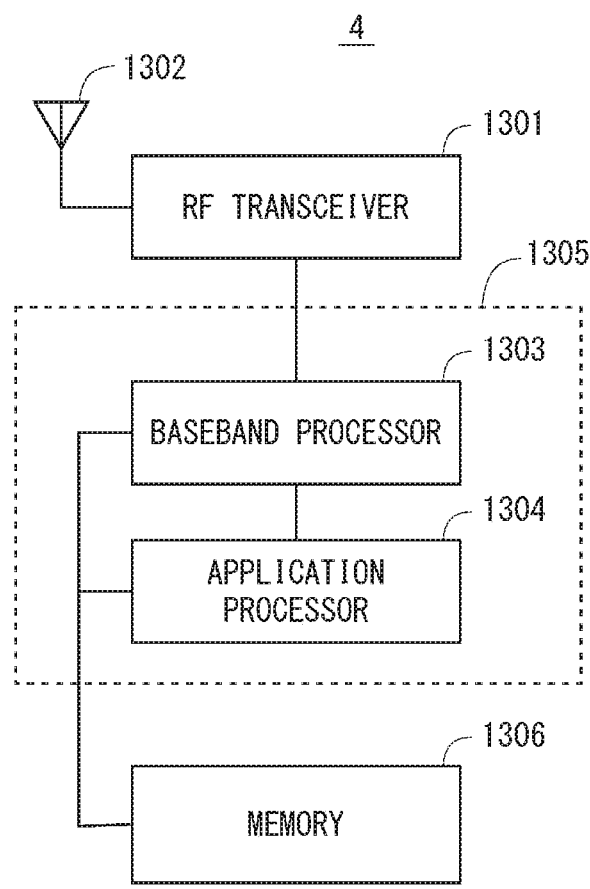
FIG. 13 is a block diagram showing a configuration example of a radio terminal according to some embodiments.

FIG. 13 is a block diagram showing a configuration example of the UE 4 according to the above embodiments. A Radio Frequency (RF) transceiver 1301 performs analog RF signal processing to communicate with the eNB 2. The analog RF signal processing performed by the RF transceiver 1301 includes frequency up-conversion, frequency down-conversion, and amplification. The RF transceiver 1301 is coupled to an antenna 1302 and a baseband processor 1303. That is, the RF transceiver 1301 receives modulation symbol data (or OFDM symbol data) from the baseband processor 1303, generates a transmission RF signal, and supplies the transmission RF signal to the antenna 1302. Moreover, the RF transceiver 1301 generates a baseband reception signal based on a reception RF signal received by the antenna 1302, and supplies the baseband reception signal to the baseband processor 1303.

The baseband processor 1303 performs digital baseband signal processing (i.e., data plane processing) and control plane processing for radio communication. The digital baseband signal processing includes (a) data compression/decompression, (b) data segmentation/concatenation, (c) generation/decomposition of a transmission format (transmission frame), (d) transmission channel coding/decoding, (e) modulation (symbol mapping)/demodulation, (f) generation of OFDM symbol data (baseband OFDM signal) by Inverse Fast Fourier Transform (IFFT), and the like. On the other hand, the control plane processing includes communication management in the layer 1 (e.g., transmission power control), layer 2 (e.g., radio resource management and hybrid automatic repeat request (HARQ) processing), and layer 3 (e.g., signaling regarding attach, mobility, and call management).

For example, in the case of LTE and LTE-Advanced, the digital baseband signal processing performed by the baseband processor 1303 may include signal processing in the Packet Data Convergence Protocol (PDCP) layer, Radio Link Control (RLC) layer, MAC layer, and PHY layer. Further, the control plane processing by the baseband processor 1303 may include the processing of the Non-Access Stratum (NAS) protocol, RRC protocol, and MAC CE.

The baseband processor 1303 may include a modem processor (e.g., Digital Signal Processor (DSP)) that performs the digital baseband signal processing and a protocol stack processor (e.g., Central Processing Unit (CPU) or Micro Processing Unit (MPU)) that performs the control plane processing. In this case, the protocol stack processor that performs the control plane processing may be integrated with an application processor 1304 described in the following.

The application processor 1304 is also referred to as a CPU, an MPU, a microprocessor, or a processor core. The application processor 1304 may include a plurality of processors (a plurality of processor cores). The application processor 1304 loads a system software program (Operating System (OS)) and various application programs (e.g., a call application, a WEB browser, a mailer, a camera operation application, a music playback application) from a memory 1306 or from another memory (not shown) and executes these programs, thereby providing various functions of the UE 4.

In some implementations, as indicated by the dashed line (1305) in FIG. 13, the baseband processor 1303 and the application processor 1304 may be integrated on a single chip. In other words, the baseband processor 1303 and the application processor 1304 may be implemented in one System on Chip (SoC) device 1305. A SoC device is sometimes referred to as a system Large Scale Integration (LSI) or a chipset.

The memory 1306 is a volatile memory or a non-volatile memory or a combination thereof. The memory 1306 may include a plurality of physically independent memory devices. The volatile memory is, for example, Static Random Access Memory (SRAM), Dynamic RAM (DRAM) or a combination thereof. The non-volatile memory may be a Mask Read Only Memory (MROM), an Electrically Erasable Programmable ROM (EEPROM), a flash memory, a hard disk drive, or any combination thereof. The memory 1306 may include an external memory device accessible from the baseband processor 1303, the application processor 1304, and the SoC 1305. The memory 1306 may include an internal memory device integrated within the baseband processor 1303, the application processor 1304, or the SoC 1305. The memory 1306 may further include a memory in a Universal Integrated Circuit Card (UICC).

The memory 1306 may store a software module(s) (computer program(s)) including instructions and data for processing by the UE 4 described in the above embodiments. In some implementations, the baseband processor 1303 or the application processor 1304 may be configured to load the software module(s) from the memory 1306 and execute the loaded software module(s), thereby performing the processing of the remote UE 4 described in the above embodiments.

As described with reference to FIGS. 12 and 13, each of the processors included in the eNB 1, eNB 2, eNB 3, and UE 4 according to the above-described embodiments executes one or more programs including instructions for causing a computer to perform the algorithm described with reference to the drawings. These programs can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), Compact Disc Read Only Memory (CD-ROM), CD-R, CD-R/W, semiconductor memories (such as Mask ROM, Programmable ROM (PROM), Erasable PROM (EPROM), flash ROM, Random Access Memory(RAM)). These programs can be stored and provided to a computer using any type of transitory computer readable media. Examples of transitory computer readable media include electric signals, optical signals, and electromagnetic waves. Transitory computer readable media can provide programs to a computer via a wired communication line (e.g. electric wires, and optical fibers) or a wireless communication line.

Other Embodiments

The descriptions of the above-described embodiments mainly focus on LTE/LTE-Advanced and extensions thereof. However, the above-described embodiments may be applied to other radio communication networks or systems. Each of the eNBs 1 to 3 described in the above embodiments can also be referred to as a radio station. The radio station in this specification may include a control node having a radio resource management function (e.g., Radio Network Controller (RNC) in UMTS or Base Station Controller (BSC) in GSM System) and a radio transmission node (e.g., NodeB in UMTS, or base transceiver station (BTS) in the GSM system).

Further, the above-described embodiments are merely examples of applications of the technical ideas obtained by the inventors. The technical ideas are not limited to the above-described embodiments, and various changes and modifications may be made thereto.

For example, the whole or part of the embodiments disclosed above can be described as, but not limited to, the following supplementary notes.

(Supplementary Note 1)

A secondary base station comprising:
at least one radio transceiver; and
at least one processor coupled to the at least one radio transceiver, wherein
the at least one processor is configured to receive an SeNB addition request message from a second master base station while providing, in cooperation with a first master base station, a secondary cell group (SCG) for dual connectivity to a radio terminal, and
the SeNB addition request message indicates whether each of at least one bearer already configured in the secondary base station for the dual connectivity is to be kept at the secondary base station.

(Supplementary Note 2)

The secondary base station according to Supplementary note 1, wherein the at least one processor is configured to, upon receiving the SeNB addition request message, distinguish one or more first bearers to be kept at the secondary base station from one or more second bearers that do not need to be kept at the secondary base station.

(Supplementary Note 3)

The secondary base station according to Supplementary note 2, wherein the at least one processor is configured to perform, with respect to the one or more second bearers, data forwarding or reporting of a data communication status or both, from the secondary base station to the second master base station.

(Supplementary Note 4)

The secondary base station according to Supplementary note 1, wherein the SeNB addition request message includes one or both of a first list indicating one or more first bearers to be kept at the secondary base station and a second list indicating one or more second bearers that do not need to be kept at the secondary base station.

(Supplementary Note 5)

The secondary base station according to Supplementary note 4, wherein
the SeNB addition request message includes at least the first list, and
the at least one processor is configured to consider that one or more bearers not included in the first list are allowed to be released or are to be moved to the second master base station.

(Supplementary Note 6)

The secondary base station according to Supplementary note 4, wherein
the SeNB addition request message includes at least the second list, and
the at least one processor is configured to consider that one or more bearers not included in the second list should be kept at the secondary base station.

(Supplementary Note 7)

The secondary base station according to any one of Supplementary notes 1 to 6, wherein
the at least one processor is configured to receive, from the first master base station, an SeNB release request message to trigger release of a resource for the dual connectivity, after accepting the SeNB addition request message from the second master base station, and
the SeNB release request message indicates whether each of the at least one bearer is to be kept at the secondary base station.

(Supplementary Note 8)

The secondary base station according to Supplementary note 7, wherein the at least one processor is configured to, upon receiving the SeNB release request message, determine the one or more first bearers to be kept at the secondary base station and the one or more second bearers that need not to be kept at the secondary base station.

(Supplementary Note 9)

The secondary base station according to Supplementary note 7 or 8, wherein the SeNB release request message is an SCG release request message indicating release of the SCG or a context release message indicating release of a context regarding the radio terminal.

(Supplementary Note 10)

A method in a secondary base station comprising:
receiving an SeNB addition request message from a second master base station while a secondary cell group (SCG) for dual connectivity is provided to a radio terminal in cooperation with a first master base station, the SeNB addition request message indicating whether each of at least one bearer already configured in the secondary base station for the dual connectivity is to be kept at the secondary base station; and
in response to the reception of the SeNB addition request message, distinguishing one or more first bearers to be kept at the secondary base station from one or more second bearers that do not need to be kept at the secondary base station.

(Supplementary Note 11)

The method according to Supplementary note 10, further comprising performing, with respect to the one or more second bearers, data forwarding or reporting of a data communication status or both, from the secondary base station to the second master base station.

(Supplementary Note 12)

The method according to Supplementary note 10 or 11, wherein the SeNB addition request message includes one or both of a first list indicating the one or more first bearers and a second list indicating the one or more second bearers.

(Supplementary Note 13)

The method according to any one of Supplementary notes 10 to 12, further comprising receiving, from the first master base station, an SeNB release request message to trigger release of a resource for the dual connectivity, after accepting the SeNB addition request message from the second master base station, wherein the SeNB release request message indicates whether each of the at least one bearer is to be kept at the secondary base station.

(Supplementary Note 14)

A program for causing a computer to execute a method in a secondary base station, the method comprising:

receiving an SeNB addition request message from a second master base station while a secondary cell group (SCG) for dual connectivity is provided to a radio terminal in cooperation with a first master base station, the SeNB addition request message indicating whether each of at least one bearer already configured in the secondary base station for the dual connectivity is to be kept at the secondary base station; and in response to the reception of the SeNB addition request message, distinguishing one or more first bearers to be kept at the secondary base station from one or more second bearers that do not need to be kept at the secondary base station.

(Supplementary Note 15)

A second master base station comprising:

at least one radio transceiver; and at least one processor coupled to the at least one radio transceiver, wherein the at least one processor is configured to transmit an SeNB addition request message to a secondary base station while the secondary base station provides, in cooperation with a first master base station, a secondary cell group (SCG) for dual connectivity to a radio terminal, and the SeNB addition request message indicates whether each of at least one bearer already configured in the secondary base station for the dual connectivity is to be kept at the secondary base station.

(Supplementary Note 16)

The second master base station according to Supplementary note 15, wherein the SeNB addition request message includes one or both of a first list indicating one or more first bearers to be kept at the secondary base station and a second list indicating one or more second bearers that do not need to be kept at the secondary base station.

(Supplementary Note 17)

The second master base station according to Supplementary note 15 or 16, wherein the at least one processor is configured to, in response to receiving a handover request from the first master base station, transmit the SeNB addition request message.

(Supplementary Note 18)

The second master base station according to Supplementary note 17, wherein the at least one processor is configured to transmit, to the first master base station, a response message to the handover request after receiving, from the secondary base station, a response message to the SeNB addition request message, and the response message to the handover request indicates whether each of the at least one bearer is to be kept at the secondary base station or moved to the second master base station.

(Supplementary Note 19)

The second master base station according to Supplementary note 18, wherein the response message to the handover request includes a third list indicating one or more bearers admitted by the second master base station and a bearer status information element indicating whether each bearer included in the third list is to be kept at the secondary base station or moved to the second master base station.

(Supplementary Note 20)

A method in a second master base station comprising transmitting an SeNB addition request message to a secondary base station while the secondary base station provides, in cooperation with a first master base station, a secondary cell group (SCG) for dual connectivity to a radio terminal, the SeNB addition request message indicating whether each of at least one bearer already configured in the secondary base station for the dual connectivity is to be kept at the secondary base station.

(Supplementary Note 21)

The method according to Supplementary note 20, wherein the SeNB addition request message includes one or both of a first list indicating one or more first bearers to be kept at the secondary base station and a second list indicating one or more second bearers that do not need to be kept at the secondary base station.

(Supplementary Note 22)

The method according to Supplementary note 20 or 21, wherein the transmitting comprises transmitting the SeNB addition request message in response to receiving a handover request from the first master base station.

(Supplementary Note 23)

The method according to Supplementary note 22, further comprising transmitting, to the first master base station, a response message to the handover request after receiving, from the secondary base station, a response message to the SeNB addition request message, wherein the response message to the handover request indicates whether each of the at least one bearer is to be kept at the secondary base station or moved to the second master base station.

(Supplementary Note 24)

A program for causing a computer to execute a method in a second master base station, the method comprising transmitting an SeNB addition request message to a secondary base station while the secondary base station provides, in cooperation with a first master base station, a secondary cell group (SCG) for dual connectivity to a radio terminal, the SeNB addition request message indicating whether each of at least one bearer already configured in the secondary base station for the dual connectivity is to be kept at the secondary base station.

(Supplementary Note 25)

A first master base station comprising:

at least one radio transceiver; and at least one processor coupled to the at least one radio transceiver, wherein the at least one processor is configured to, while a secondary base station provides, in cooperation with the first master base station, a secondary cell group (SCG) for dual connectivity to a radio terminal, transmit a handover request of the radio terminal to a second master base station and receive a response message to the handover request from the second master base station, and the response message indicates whether each of at least one bearer already configured in the secondary base station for the dual connectivity is to be kept at the secondary base station or moved to the second master base station.
(Supplementary Note 26)
The first master base station according to Supplementary note 25, wherein the response message includes a third list indicating one or more bearers admitted by the second master base station and a bearer status information element indicating whether each bearer included in the third list is to be kept at the secondary base station or moved to the second master base station.
(Supplementary Note 27)
The first master base station according to Supplementary note 25 or 26, wherein
the at least one processor is configured to, after receiving the response message, transmit, to the secondary base station, an SeNB release request message to trigger release of a resource for the dual connectivity, and
the SeNB release request message indicates whether each of the at least one bearer is to be kept at the secondary base station.
(Supplementary Note 28)
The first master base station according to Supplementary note 27, wherein the release message includes a bearer status information element indicating whether each of the at least one bearer is to be kept at the secondary base station or to be released.
(Supplementary Note 29)
A method in a first master base station comprising:
transmitting a handover request of the radio terminal to a second master base station while a secondary base station provides, in cooperation with the first master base station, a secondary cell group (SCG) for dual connectivity to a radio terminal; and
receiving a response message to the handover request from the second master base station, the response message indicating whether each of at least one bearer already configured in the secondary base station for the dual connectivity is to be kept at the secondary base station or moved to the second master base station.
(Supplementary Note 30)
The method according to Supplementary note 29, wherein the response message includes a third list indicating one or more bearers admitted by the second master base station and a bearer status information element indicating whether each bearer included in the third list is to be kept at the secondary base station or moved to the second master base station.
(Supplementary Note 31)
The method according to Supplementary note 29 or 30, further comprising after the response message is received, transmitting, to the secondary base station, an SeNB release request message to trigger release of a resource for the dual connectivity, wherein the SeNB release request message indicates whether each of the at least one bearer is to be kept at the secondary base station.
(Supplementary Note 32)
A program for causing a computer to execute a method in a first master base station, the method comprising:
transmitting a handover request of the radio terminal to a second master base station while a secondary base station provides, in cooperation with the first master base station, a secondary cell group (SCG) for dual connectivity to a radio terminal; and
receiving a response message to the handover request from the second master base station, the response message indicating whether each of at least one bearer already configured in the secondary base station for the dual connectivity is to be kept at the secondary base station.
(Supplementary Note 33)
A radio terminal comprising:
a first master base station, a second master base station, and at least one radio transceiver to communicate with a secondary base station; and
at least one processor, wherein
the first master base station, the second master base station, and the secondary base station are configured to, while the secondary base station provides, in cooperation with the first master base station, a secondary cell group (SCG) for dual connectivity to the radio terminal, execute a procedure for changing a master base station in the dual connectivity from the first master base station to the second master base station, and
the at least one processor is configured to receive, from the first master base station, a master cell group (MCG) configuration regarding the second master base station and an SCG configuration regarding the secondary base station during the procedure,
the at least one processor is configured to, in response to receiving the MCG configuration and the SCG configuration, consider whether each of at least one bearer already configured in the secondary base station for the dual connectivity is to be kept at the secondary base station or moved to the second master base station, and
the at least one processor is configured to change the master base station in the dual connectivity from the first master base station to the second master base station while keeping a connection to the SCG in the secondary base station, the connection including at least one bearer.
(Supplementary Note 34)
The radio terminal according to Supplementary note 33, wherein the at least one processor is configured to, in response to receiving the MCG configuration and the SCG configuration, distinguish one or more first bearers to be kept at the secondary base station from one or more second bearers to be moved to the second master base station.
The present application is based upon and claims the benefit of priority from Japanese Patent Application No. 2015-152736, filed on Jul. 31, 2015, the entire contents of which are hereby incorporated by reference.

REFERENCE SIGNS LIST 1-3 BASE STATIONS (eNBs)
4 RADIO TERMINAL (UE)
1201 RF TRANSCEIVER
1204 PROCESSOR
1205 MEMORY

The invention claimed is:
1. A secondary base station comprising:
at least one radio transceiver; and
at least one processor coupled to the at least one radio transceiver, wherein
the at least one processor is configured to receive a Secondary RAN node addition request message from a second master base station while the secondary base station provides a radio terminal with a secondary cell group (SCG) for dual connectivity in cooperation with a first master base station, and
the Secondary RAN node addition request message includes one or both of: a first list indicating one or more first bearers to be kept at the secondary base station; and a second list indicating one or more second bearers that do not need to be kept at the secondary base station, to indicate whether each of at least one bearer that has already been configured in the secondary base station for the dual connectivity is to be kept at the secondary base station.

2. The secondary base station according to claim 1, wherein the at least one processor is configured to, upon receiving the Secondary RAN node addition request message, distinguish the one or more first bearers to be kept at the secondary base station from the one or more second bearers that do not need to be kept at the secondary base station.

3. The secondary base station according to claim 2, wherein the at least one processor is configured to perform, with respect to the one or more second bearers, data forwarding or reporting of a data communication status or both, from the secondary base station to the second master base station.

4. The secondary base station according to claim 1, wherein
the Secondary RAN node addition request message includes at least the first list, and
the at least one processor is configured to consider that one or more bearers not included in the first list are allowed to be released or are to be moved to the second master base station.

5. The secondary base station according to claim 1, wherein
the at least one processor is configured to, after accepting the Secondary RAN node addition request message from the second master base station, receive from the first master base station a Secondary RAN node release request message to trigger release of resources for the dual connectivity, and
the Secondary RAN node release request message indicates whether each of the at least one bearer is to be kept at the secondary base station.

6. The secondary base station according to claim 5, wherein the at least one processor is configured to, upon receiving the Secondary RAN node release request message, determine the one or more first bearers to be kept at the secondary base station and the one or more second bearers that need not to be kept at the secondary base station.

7. The secondary base station according to claim 5, wherein the Secondary RAN node release request message is an SCG release request message indicating release of the SCG or a context release message indicating release of a context regarding the radio terminal.

8. A method in a secondary base station comprising:
receiving a Secondary RAN node addition request message from a second master base station while providing a radio terminal with a secondary cell group (SCG) for dual connectivity in cooperation with a first master base station, the Secondary RAN node addition request message including one or both of: a first list indicating one or more first bearers to be kept at the secondary base station; and a second list indicating one or more second bearers that do not need to be kept at the secondary base station, to indicate whether each of at least one bearer that has already been configured in the secondary base station for the dual connectivity is to be kept at the secondary base station; and
upon receiving the Secondary RAN node addition request message, distinguishing the one or more first bearers to be kept at the secondary base station from the one or more second bearers that do not need to be kept at the secondary base station.

9. The method according to claim 8, further comprising performing, with respect to the one or more second bearers, data forwarding or reporting of a data communication status or both, from the secondary base station to the second master base station.

10. The method according to claim 8, wherein the Secondary RAN node addition request message includes at least the first list, and
the distinguishing includes considering consider that one or more bearers not included in the first list are allowed to be released or are to be moved to the second master base station.

11. The method according to claim 8, further comprising receiving, from the first master base station, a Secondary RAN node release request message to trigger release of a resource for the dual connectivity, after accepting the Secondary RAN node addition request message from the second master base station, wherein the Secondary RAN node release request message indicates whether each of the at least one bearer is to be kept at the secondary base station.

12. A second master base station comprising:
at least one radio transceiver; and
at least one processor coupled to the at least one radio transceiver, wherein
the at least one processor is configured to send a Secondary RAN node addition request message to a secondary base station while the secondary base station provides a radio terminal with a secondary cell group (SCG) for dual connectivity in cooperation with a first master base station, and
the Secondary RAN node addition request message including one or both of: a first list indicating one or more first bearers to be kept at the secondary base station; and a second list indicating one or more second bearers that do not need to be kept at the secondary base station, to indicate whether each of at least one bearer that has already been configured in the secondary base station for the dual connectivity is to be kept at the secondary base station.

13. The second master base station according to claim 12, wherein the at least one processor is configured to send the Secondary RAN node addition request message in response to receiving a handover request from the first master base station.

14. The second master base station according to claim 13, wherein
the at least one processor is configured to send to the first master base station a response message to the handover request after receiving from the secondary base station a response message to the Secondary RAN node addition request message, and
the response message to the handover request indicates whether each of the at least one bearer is to be kept at the secondary base station or moved to the second master base station.

15. The second master base station according to claim 14, wherein the response message to the handover request includes a third list indicating one or more bearers admitted by the second master base station and a bearer status information element indicating whether each bearer included in the third list is to be kept at the secondary base station or moved to the second master base station.

* * * * *